United States Patent

Obayashi et al.

[19]

[11] Patent Number: 5,838,825
[45] Date of Patent: Nov. 17, 1998

[54] APPARATUS FOR DECOMPRESSING IMAGE DATA WHICH HAS BEEN COMPRESSED USING A LINEAR TRANSFORM

[75] Inventors: Yoshimasa Obayashi, Kyoto; Katsuyuki Kaneko, Moriguchi; Yoshiteru Mino, Hirakata; Sadafumi Tomida, Kobe, all of Japan

[73] Assignee: Matsushita Electric Industrial Co., Ltd., Kadoma, Japan

[21] Appl. No.: 784,709

[22] Filed: Jan. 16, 1997

[30] Foreign Application Priority Data

Jan. 17, 1996 [JP] Japan .................................. 8-005934

[51] Int. Cl.[6] ............................... G06K 9/36; G06K 9/46
[52] U.S. Cl. .......................... 382/233; 382/277; 382/250
[58] Field of Search .................................... 382/233, 248, 382/250, 277

[56] References Cited

U.S. PATENT DOCUMENTS 4,933,892  6/1990  Nakaya et al. .

5,387,982  2/1995  Kitaura et al. .......................... 382/250

FOREIGN PATENT DOCUMENTS 251978   2/1990  Japan .
5167860  7/1993  Japan .

*Primary Examiner*—Phuoc Tran
*Attorney, Agent, or Firm*—Price, Gess & Ubell

[57] ABSTRACT

One block of non-zero coefficients obtained through the decoding of the entropy decoding unit 2024 is stored in the coefficient storage unit 121 in accordance with positional coordinates calculated by the non-zero coefficient scanning order calculation unit 2023a and the non-zero coefficient position conversion unit 2023b. The stored non-zero coefficients are then inverse quantized by the inverse quantization unit 2022. The non-zero coefficient range calculation unit 122 specifies a region of the coefficient storage unit 121 in which the non-zero coefficients are stored. The calculation order control unit 123 controls the inverse DCT unit 2021 to only perform an inverse DCT (discrete cosine transform) for non-zero coefficients located in the specified region.

23 Claims, 21 Drawing Sheets

FIG. 4

| SCANNING ORDER NUMBER | HORIZONTAL COORDINATE U | VERTICAL COORDINATE V |
|---|---|---|
| 1 | 0 | 0 |
| 2 | 1 | 0 |
| 3 | 0 | 1 |
| 4 | 0 | 2 |
| 5 | 1 | 1 |
| 6 | 2 | 0 |
| 7 | 3 | 0 |
| 8 | 2 | 1 |
| 9 | 1 | 2 |
| 10 | 0 | 3 |
| 11 | 1 | 3 |
| 12 | 2 | 2 |
| 13 | 3 | 1 |
| 14 | 3 | 2 |
| 15 | 2 | 3 |
| 16 | 3 | 3 |

FIG. 7

| INPUTTED NON-ZERO COEFFICIENT POSITION (U,V) | INPUTTED HORIZONTAL COORDINATE U | CANDIDATE Umin FOR LOWEST HORIZONTAL COORDINATE VALUE | CANDIDATE Umax FOR HIGHEST HORIZONTAL COORDINATE VALUE | INPUTTED VERTICAL COORDINATE V | CANDIDATE Vmin FOR LOWEST VERTICAL COORDINATE VALUE | CANDIDATE Vmax FOR HIGHEST VERTICAL COORDINATE VALUE |
|---|---|---|---|---|---|---|
| (INITIAL VALUES) | — | 8 | −1 | — | 8 | −1 |
| (0, 0) | 0 | 0 | 0 | 0 | 0 | 0 |
| (1, 0) | 1 | 0 | 1 | 0 | 0 | 0 |
| (1, 1) | 1 | 0 | 1 | 1 | 0 | 1 |
| (1, 2) | 1 | 0 | 1 | 2 | 0 | 2 |
| (FINAL VALUES) | — | 0 | 1 | — | 0 | 2 |

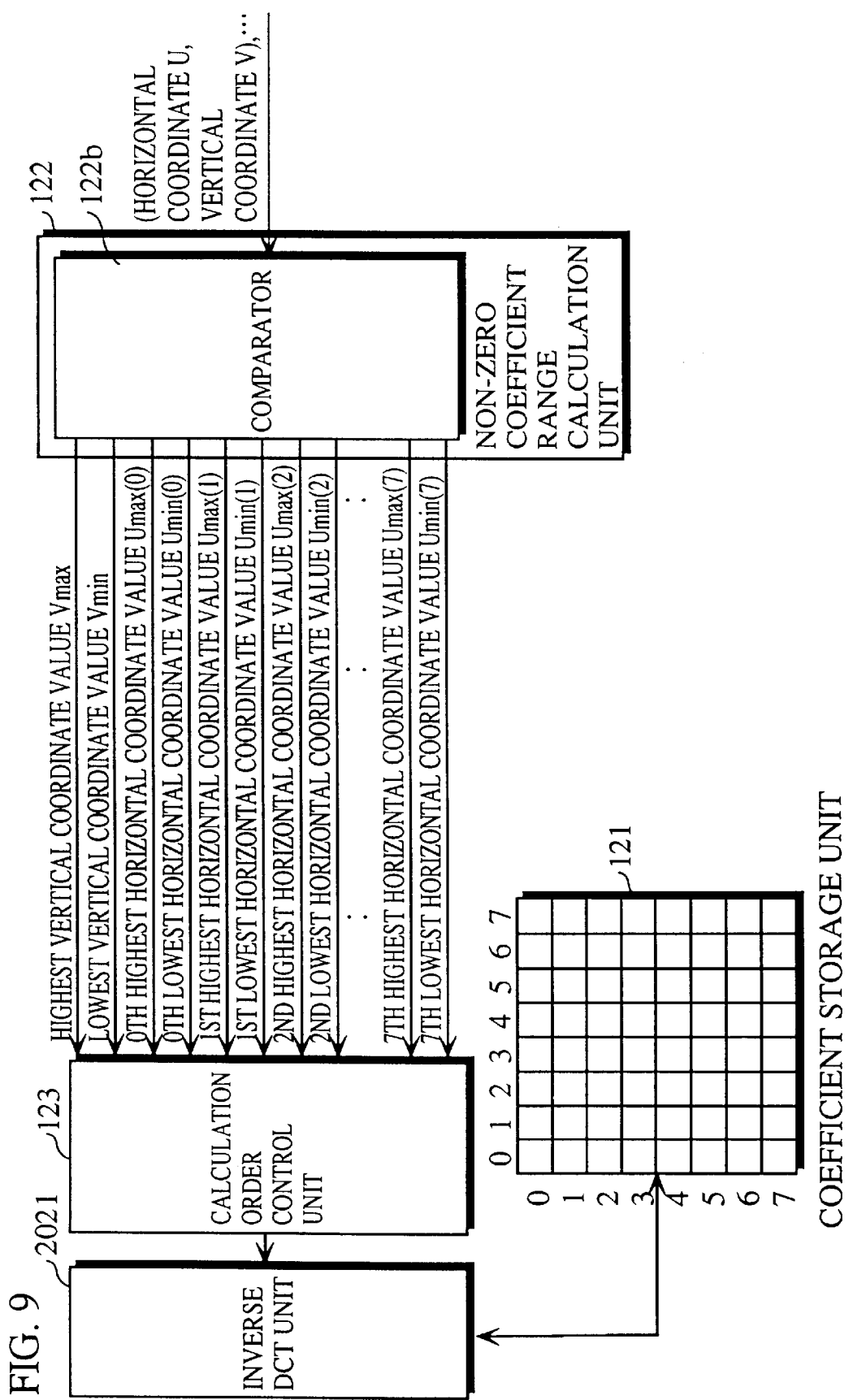

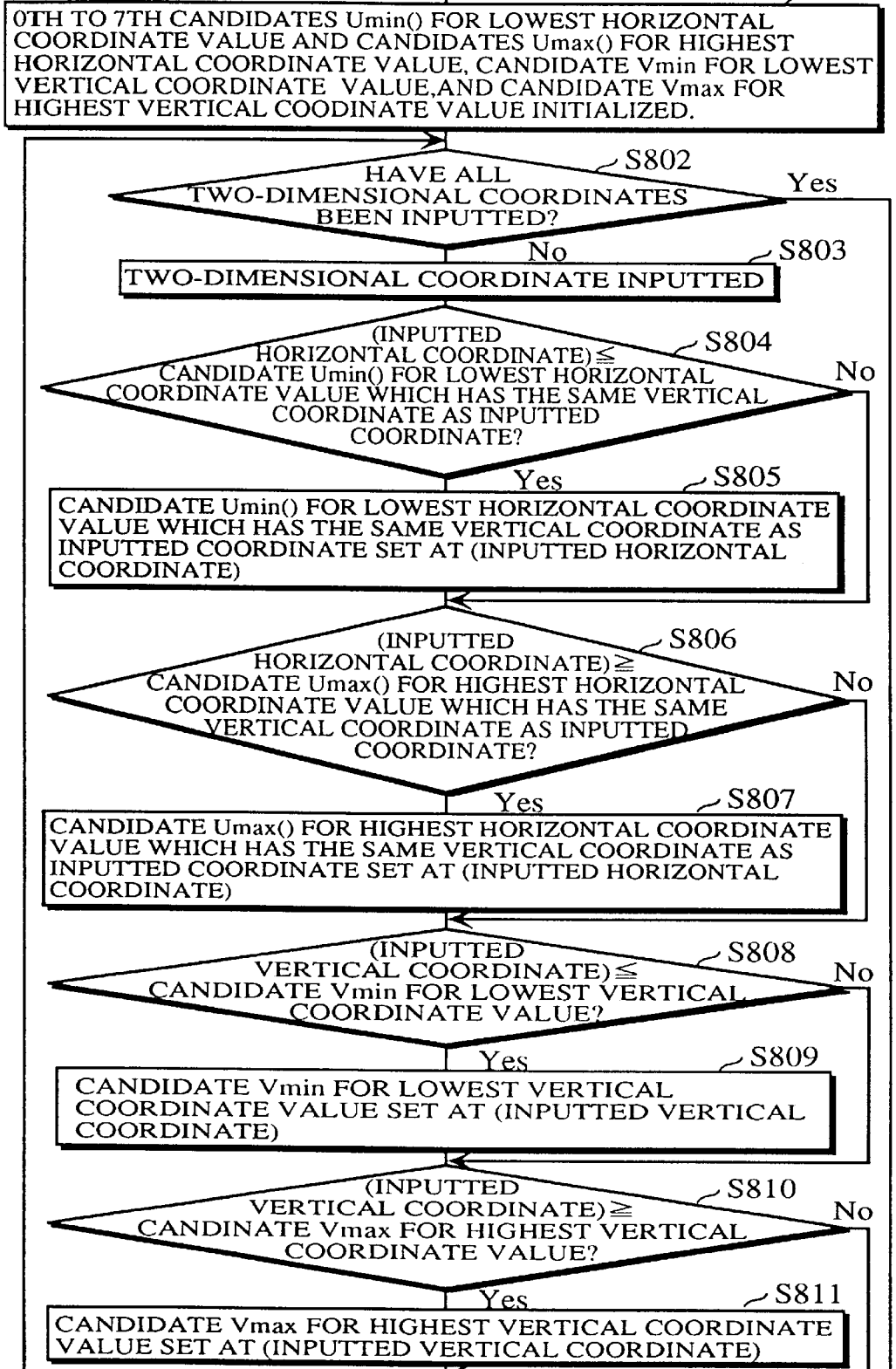

FIG. 11

| INPUTTED NON-ZERO COEFFICIENT POSITION (U,V) 901 | 0TH LOWEST HORIZONTAL COORDINATE VALUE Umin(0) 902 | 0TH HIGHEST HORIZONTAL COORDINATE VALUE Umax(0) 903 | 1ST LOWEST HORIZONTAL COORDINATE VALUE Umin(1) 904 | 1ST HIGHEST HORIZONTAL COORDINATE VALUE Umax(1) 905 | 7TH LOWEST HORIZONTAL COORDINATE VALUE Umin(7) 906 | 7TH HIGHEST HORIZONTAL COORDINATE VALUE Umax(7) 907 | CANDIDATE Vmin FOR LOWEST VERTICAL COORDINATE VALUE 908 | CANDIDATE Vmax FOR HIGHEST VERTICAL COORDINATE VALUE 909 |
|---|---|---|---|---|---|---|---|---|
| (INITIAL VALUES) | ∞ | −1 | ∞ | −1 | ∞ | −1 | ∞ | −1 |
| (0, 0) | 0 | 0 | ∞ | −1 | ∞ | −1 | 0 | 0 |
| (1, 0) | 0 | 1 | ∞ | −1 | ∞ | −1 | 0 | 0 |
| (1, 1) | 0 | 1 | 1 | 1 | ∞ | −1 | 0 | 1 |
| (1, 2) | 0 | 1 | 1 | 1 | ∞ | −1 | 0 | 2 |
| (FINAL VALUES) | 0 | 1 | 1 | 1 | ∞ | −1 | 0 | 2 |

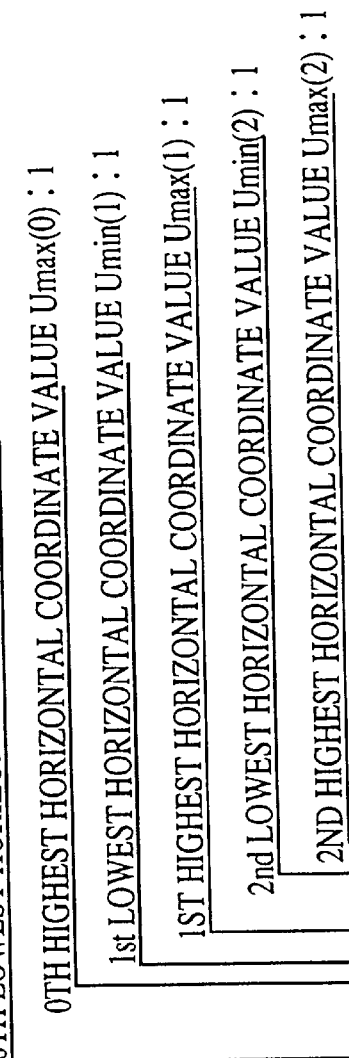

0TH LOWEST HORIZONTAL COORDINATE VALUE Umin(0) : 0
0TH HIGHEST HORIZONTAL COORDINATE VALUE Umax(0) : 1
1st LOWEST HORIZONTAL COORDINATE VALUE Umin(1) : 1
1ST HIGHEST HORIZONTAL COORDINATE VALUE Umax(1) : 1
2nd LOWEST HORIZONTAL COORDINATE VALUE Umin(2) : 1
2ND HIGHEST HORIZONTAL COORDINATE VALUE Umax(2) : 1

LOWEST VERTICAL COORDINATE VALUE Vmin : 0
HIGHEST VERTICAL COORDINATE VALUE Vmax : 2

FIG. 12B

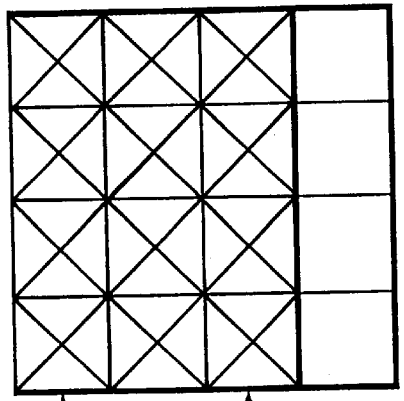

LOWEST VERTICAL COORDINATE VALUE Vmin : 0
HIGHEST VERTICAL COORDINATE VALUE Vmax : 2

| ZIGZAG SCANNING ORDER NUMBER | HIGHEST HORIZONTAL COORDINATE VALUE Umax | HIGHEST VERTICAL COORDINATE VALUE Vmax |
|---|---|---|
| 1 | 0 | 0 |
| 2 | 1 | 0 |
| 3 | 1 | 1 |
| 4 | 1 | 2 |
| 5 | 1 | 2 |
| 6 | 2 | 2 |
| 7 | 3 | 2 |
| 8 | 3 | 2 |
| 9 | 3 | 2 |
| 10 | 3 | 3 |
| 11 | 3 | 3 |
| 12 | 3 | 3 |
| 13 | 3 | 3 |
| 14 | 3 | 3 |
| 15 | 3 | 3 |
| 16 | 3 | 3 |

HIGHEST VERTICAL COORDINATE VALUE Vmax : 2

HIGHEST HORIZONTAL COORDINATE VALUE Umax : 1

HIGHEST VERTICAL COORDINATE VALUE Vmax : 2

FIG. 20A

| ZIGZAG SCANNING ORDER NUMBER | 0TH HIGHEST HORIZONTAL COORDINATE VALUE Umax(0) | 1ST HIGHEST HORIZONTAL COORDINATE VALUE Umax(1) | 2ND HIGHEST HORIZONTAL COORDINATE VALUE Umax(2) | 3RD HIGHEST HORIZONTAL COORDINATE VALUE Umax(3) | HIGHEST VERTICAL COORDINATE VALUE Vmax |
|---|---|---|---|---|---|
| 1 | 0 | −1 | −1 | −1 | 0 |
| 2 | 1 | −1 | −1 | −1 | 0 |
| 3 | 1 | 0 | −1 | −1 | 1 |
| 4 | 1 | 0 | 0 | −1 | 2 |
| 5 | 1 | 1 | 0 | −1 | 2 |
| 6 | 2 | 1 | 0 | −1 | 2 |
| 7 | 3 | 1 | 0 | −1 | 2 |
| 8 | 3 | 2 | 0 | −1 | 2 |
| 9 | 3 | 2 | 1 | −1 | 2 |
| 10 | 3 | 2 | 1 | 0 | 3 |
| 11 | 3 | 2 | 1 | 1 | 3 |
| 12 | 3 | 2 | 2 | 1 | 3 |
| 13 | 3 | 3 | 2 | 1 | 3 |
| 14 | 3 | 3 | 3 | 1 | 3 |
| 15 | 3 | 3 | 3 | 2 | 3 |
| 16 | 3 | 3 | 3 | 3 | 3 |

FIG. 20B

| ZIGZAG SCANNING ORDER NUMBER | 0TH HIGHEST HORIZONTAL COORDINATE VALUE Umax(0) | 1ST HIGHEST HORIZONTAL COORDINATE VALUE Umax(1) | 2ND HIGHEST HORIZONTAL COORDINATE VALUE Umax(2) | 3RD HIGHEST HORIZONTAL COORDINATE VALUE Umax(3) | HIGHEST VERTICAL COORDINATE VALUE Vmax |
|---|---|---|---|---|---|
| 1 | 0 | −1 | −1 | −1 | 0 |
| 2,3 | 1 | 0 | −1 | −1 | 1 |
| 4,5,6 | 2 | 1 | 0 | −1 | 2 |
| 7,8,9,10 | 3 | 2 | 1 | 0 | 3 |
| 11,12,13 | 3 | 3 | 2 | 1 | 3 |
| 14,15 | 3 | 3 | 3 | 2 | 3 |
| 16 | 3 | 3 | 3 | 3 | 3 |

APPARATUS FOR DECOMPRESSING IMAGE DATA WHICH HAS BEEN COMPRESSED USING A LINEAR TRANSFORM

BACKGROUND OF THE INVENTION

1. Field of the Invention

The present invention relates to an apparatus for decompressing image data which has been compressed by a linear transform, such as discrete cosine transform, and in particular relates to an enhancement technique for increasing the speed of sum of products calculations.

2. Prior Art

Various high-efficiency coding methods have boon developed in recent years for the compression and decompression of image data to improve the efficiency of the transmission and storage of images of considerable data size.

One example of such methods is the JPEG compression technique (an international standard developed by the Joint Photographic Experts Group of the ISO and CCITT SGVII) for color still images which is used, for example, by color facsimile machines which operate according to GIV standard. The details of this standard are disclosed, for example, between page 160 and page 182 of the December 1991 edition of "Interface" magazine (published by CQ Publications), or between page 115 and page 142 of the Oct. 15, 1990 edition of "Nikkei Electronics" (Nikkei Business Publications, Inc,).

The following is a description of a conventional image date compression/decompression apparatus for the JPEG method, with reference to the drawings.

A block diagram showing the configuration of a conventional image data compression/decompression apparatus is shown in FIG. 1. The construction elements of this image data compression/decompression apparatus can be broadly classified into a compression unit 2010, a decompression unit 2020 and a table storage unit 2030.

The compression unit 2010 compresses the original image data 2001 and transmits the resulting encoded data to a transfer circuit/storage unit 2003. To perform such compression, it is made up of a DCT unit 2011, a quantization unit 2012, a scanning unit 2013 and an entropy coding unit 2014. Here, "DCT" is an abbreviation of "Discrete Cosine Transform".

The decompression unit 2020 decompresses encoded data which is received from the transfer circuit/storage unit 2003, and in doing so executes a process which restores the data to reproduction image data 2002 which approximates to the original image data 2001. In order to perform such decompression, the decompression unit 2020 is made up of an entropy decoding unit 2024, a coordinate calculation unit 2023, an inverse quantization unit 2022, and an inverse DCT unit 2021. The functions of these four units 2021–2024 in the decompression unit 2020 are the exact opposites of the functions of the four units 2011–2014 of the compression unit 2010.

The table storage unit 2030 is made up of three kinds Of data table for the compression conditions of the image data, these tables namely being the quantization table 2031, the scanning table 2032, and the encoding table 2033. These tables are referred to by the compression unit 2010 and by the decompression unit 220 in performing their respective transform and inverse transform processes.

The following is an explanation of the operation of a conventional image data compression/decompression apparatus of the above construction, with reference to the example of compression and decompression of image data given in FIG. 2.

The present example describes the case when the original image data is the 4*4 image block given in the drawing au original image data P(x,y) 2101. In this example, each value P(x,y) expresses the luminescence of a pixel using a four-bit figure. It should be noted here that while JPEG techniques actually divide still images into a plurality of blocks which are each made up of 8*8 pixels, for simplicity's sake the present explanation uses pixel blocks of the dimensions stated above.

The original image data P(x,y) 2101 is first stored in a work memory (not illustrated) and is then compressed by the compression unit 2010 according to the process described below.

1. The original image data P(x,y) 2101 is converted into the DCT coefficients S(u,v) 2102 by the DCT unit 2011. More specifically, the compression unit 2010 performs a DCT operation as described by "Equation 1".

Equation 1

$$S(u,v) = \frac{1}{2} C(u)C(v) \sum_{x=0}^{3} \sum_{y=0}^{3} (P(x,y) - Ls)\cos\frac{(2x+1)u\pi}{8} \cos\frac{(2y+1)v\pi}{8}$$

when:
x,y=position of a pixel in the original image data
u,v=position of a DCT coefficient $$C(u), C(v) = \frac{1}{\sqrt{2}}$$

when u,v=0
otherwise C(u),C(v)=1
Ls=8 i. This DCT is a linear transform and its output corresponds to spatial frequencies. Putting this in other words, the top-leftmost of the DCT coefficients S(u,v) 2102, S(O,O), corresponds to the coefficient with the lowest frequency DC component, with coefficients with progressively higher coordinates (u,v) being coefficients with progressively higher frequencies.

ii. The DCT coefficients S(u,v) 2102 are converted into the quantized DCT coefficients R(v,v) 2103 by the quantization unit 2012. More specifically, the quantization unit 2012 uses the quantization table Q(u,v) 2111 and performs the rounding off operation shown as Equation 2.

Equation 2

$$R(u,v) = \text{round}(S(u,v)/Q(u,v))$$

iii. Next, the quantized DCT coefficients R(u,v) 2103 are converted into grouped data Qn(z,w) 2104. Here, the scan unit 2013 uses the scanning method stored in the scan table 2032, which is to say it reads the coefficients in the order shown by the arrow which joins up the quantized DCT coefficients R(u,v) 2103 in FIG. 2. This reading method is hereinafter referred to as "zigzag scanning". By doing so, coefficients are grouped together into a single row which is expressed by grouped data Qn(z,w) 2104 for a number z of consecutive zeros (known as the "zero run length") and coefficients which are not zero ("non-zero coefficients").

As one example, when the quantized DCT coefficients R(u,v) 2103 are scanned in the illustrated direction, the first four coefficients are zeros which are followed by the value "−2" to give the grouped data Q2(4,−2).

It should be noted here that the predetermined grouped data "END" is placed at the end of the grouped data Qn(z,w) a 2104 for one block to show that there is no more data in the present block.

iv. The grouped data Qn(z,w) 2104 is converted into a corresponding code word Wn 2105 by the entropy coding unit 2014. This is then converted into a bit series (in the present example, encoded data W2106) which is then sent to the transfer circuit/storage unit 2003. In more detail, the entropy coding unit 2014 uses the encoding table 2033 to perform a type of entropy encoding called Huffman coding.

Here, the same quantization table 2031 and encoding table 2033 used by the compression unit 2010 should be used by the decompression unit 2020 during decompression. To enable this, these tables are added as parameters to the start of the encoded date W2106 when it is outputted.

When the encoded data W2106 outputted to the transfer circuit/storage unit 2003 has been read by the decompression unit 2020, decoding is performed according to a procedure which is the opposite of the processing performed by the compression unit 2010, using the same quantization table 2031 and encoding table 2033 as before.

i'. First, the encoded data W2106 is decoded by the entropy decoding unit 2024 to give the grouped data Q'n(z,w) 2107.

ii. The grouped data Q'n(z,w) 2107 is restored to the quantized DCT coefficients R'(u,v) 2108 by the coordinate calculation unit 2023. More specifically, the coordinate calculation unit 2023 determines the coordinates u, v of the quantized DCT coefficients R'(u,v) 2108 from the zero-run length z in each set of grouped data Q'n(z,w) 2107, sets the non-zero coefficients w as quantized DCT coefficients R'(u,v), and sets the quantized DCT coefficients R'(u,v) at the remaining coordinate positions at zero.

iii'. The quantized DCT coefficients R'(u,v) 2108 are next inverse quantized by the inverse quantizing operation performed by the inverse quantization unit 2022 to give the DCT coefficients S'(u,v) 2109. This inverse quantizing operation is shown in Equation 3.

Equation 3

$$S'(u,v) = R'(u,v) * Q(u,v)$$

iv'. The DCT coefficients S'(u,v) are finally restored to the reproduction image data 2002 by an inverse DCT operation performed by the Inverse DCT unit 2021 in accordance with Equation 4.

Equation 4

$$S(u,v) = \frac{1}{2} \sum_{u=0}^{3} \sum_{v=0}^{3} C(u)C(v)S'(u,v)\cos\frac{(2x+1)u\pi}{8} \cos\frac{(2y+1)v\pi}{8} + Ls$$

To reduce the amount of calculation performed by the inverse DCT unit 2021, the two-dimensional inverse DCT operation shown by Equation 4 may be replaced by a one-dimensional inverse DCT operation performed in the u axis which is shown in Equation 5 and a one-dimensional inverse DCT operation performed in the v axis which is shown in Equation 6.

Equation 5

$$G(x,v) = \frac{1}{\sqrt{2}} \sum_{x=0}^{3} C(u)S'(u,v)\cos\frac{(2x+1)u\pi}{8}$$

when (x=0,1,2,3; v=0,1,2,3)

Equation 6

$$P'(x,y) = \frac{1}{\sqrt{2}} \sum_{x=0}^{3} C(v)G(x,v)\cos\frac{(2y+1)v\pi}{8}$$

when (x=0,1,2,3; v=0,1,2,3)

By means of the above process, image data which has been compressed using a JPEG method can be restored to image data which corresponds to the original image data.

Conventional image data compression/decompression apparatuses, such as that described above, have a drawback in that when the encoded data W2106 is decompressed by the decompression unit 2020, a very large number of sum of products calculations need to be performed.

In order to restore reproduction Image data 2110, it is first necessary to find 16 sets of G(x,v) using Equation 5. Here, each set requires four gum of products calculations, making a total of 64 calculations. Following this, it is necessary to find 16 sets of P'(x,y) using Equation 6, with each set requiring four sum of products calculations, which again makes a total of 64 calculations. In this way, a total of 128 sum of products calculations are necessary to find the reproduction image data P'(x,y) 2110 for one block.

Under JPEG methods, one block is made up of 8*8 pixels, so that 1024 (=8*8*8+8*8*8) sum of products calculations become necessary for each block which composes the image data. This large number of sum of products calculations slows the operation of the decompression unit 2020 in a conventional image data compression/decompression apparatus and creates the problem of necessitating a large amount of processing time.

SUMMARY OF THE INVENTION

In view of the stated problems for conventional apparatuses, it is a primary object of the present invention to provide an image data decompression apparatus which quickly decompresses image data which has been compressed according to a linear transform such as JPEG methods.

In more detail, the present invention restores an 8*8 block of image, such as described above, to reproduction image data using loss than the 1,024 sum of products calculations which are necessary for a conventional apparatus.

In order to achieve the stated object, the present invention is an apparatus for decompressing compressed image data, wherein the compressed image data has been compressed by performing an n-dimensional transform (n being an integer) for groups of original image data which include every pixel in an n-dimensional coordinate space, sorting each resulting coefficient in the n-dimensional coordinate space into a sequence according to a predetermined order, and forming sets of grouped data which are each made of a non-zero coefficient and an order number showing a position of the non-zero coefficient in the sequence, the apparatus including: a storage unit (a) which includes an area for storing every coefficient in the n-dimensional coordinate space; an initializing unit for having the storage unit(a) store a value zero for every coefficient; a coordinate value calculating unit(c) for calculating, on receiving a set of the grouped data, coordinate values in the n-dimensional coordinate space for the non-zero coefficient included the set of the grouped data, booed on the order number included in the set of grouped data; a writing unit(d) for writing a non-zero coefficient into a storage location in the storage unit(a) which corresponds to the coordinate values calculated by the coordinate value calculating unit(c); a non-zero coefficient region specifying unit(s) for specifying a region in the storage unit(a) which stores non-zero coefficients; and an inverse transform unit(f) for restoring data to date which corresponds to original image data by performing an n-dimensional inverse transform for only coefficients in the region specified by the non-zero coefficient region specifying unit(a), wherein the n-dimensional inverse transform is a sum of products calculation using the coefficients.

The above construction is an apparatus which can decompress compressed image data at high speed by omitting unnecessary sum of products calculations for coefficients whose value is zero (hereinafter called "zero coefficients").

Also, the n-dimensional inverse transform may be divided into n separate one-dimensional inverse transforms, the non-zero coefficient region specifying unit(s) may specify a coordinate range which shows where the non-zero coefficients are located, in each out of m axes (where m in an integer between one and n) which compose the n-dimensional coordinate space, and the inverse transform unit(f) may include; a first inverse transform unit(f1) which performs a one-dimensional inverse transform, for each of the m axes, using only the coefficients which belong to the coordinate range specified by the non-zero coefficient region specifying unit(e); and a second inverse transform unit(f2) for performing a one-dimensional inverse transform using all of the coefficients in the coordinate range for each of the (n–m) remaining axes.

The above construction performs an n-dimensional inverse transform by dividing it into one-dimensional inverse transforms, and is able to avoid unnecessary sum of products in each axis, thereby completing the n-dimensional inverse transform with fewer sum of products calculations than when a n-dimensional inverse transform is performed in one step.

Also, the non-zero coefficient region specifying unit(e) specifies, in each of the m axes, a highest value out of the coordinates of all of the non-zero coefficients calculated by the coordinate value calculating unit(c), and sets the highest value as one edge of the coordinate range.

The above construction is able to omit sum of products calculations for zero coefficients whose coordinate values exceed the highest values, thereby speeding up the decompression process.

Also, the non-zero coefficient region specifying unit(e) may specify, in each of the m axes, a lowest value and a highest value out of the coordinates of all of the non-zero coefficients calculated by the coordinate value calculating unit(c), and may set a range from the lowest value to the highest value as the coordinate range.

The above construction is able to omit sum of products calculations for zero coefficients whose coordinate values exceed the highest values or whose coordinate values are below the lowest values, thereby speeding up the decompression process.

Also, m may be equal to n.

The above construction is able to omit sum of products calculations for zero coefficients whose coordinate values exceed the highest values or whose coordinate values are below the lowest values in each of the coordinate axes, thereby speeding up the decompression process.

Also, the transform may be an orthogonal transform, and the inverse transform may be an inverse orthogonal transform. The transform may be a discrete cosine transform (hereinafter, "DCT"), and the inverse transform may be an inverse discrete cosine transform (hereinafter, "inverse DCT").

The above apparatus is a favorable decompression apparatus for image data which has been decompressed using industrial standards such as JPEG.

Also, m may be at least two, and the inverse transform unit(f) may further include a sorting unit(f9) for arranging the m coordinate axes into order by sorting lengths of the coordinate ranges specified by the non-zero coefficient region specifying unit(e) into descending order, and wherein the first inverse transform unit(f1) may perform one-dimensional inverse transform in the m axes in the order into which the axes have been arranged by the sorting unit(f9) after the second inverse transform unit(f2) has completed a one-dimensional inverse transform.

The above apparatus, instead of merely just omitting sum of products calculations for zero coefficients whose coordinate values exceed the highest values or whose coordinate values are below the lowest values in each of the coordinate axes, performs one-dimensional inverse transforms in coordinate axes in an order which enables a reduction in the number of sum of products calculations, so that the n-dimensional inverse transform can be completed with a lower number of sum of products calculations than are necessary when no attention is paid to the order of the axes in which one-dimensional inverse transforms are performed.

Also, the non-zero coefficient region specifying unit(e) may include: a first correspondence storage unit(e1) for storing order numbers and, corresponding to each order number, a highest value in each coordinate axis out of non-zero coefficients when it is presumed that every coefficient having an order number equal to or below a present order number is a non-zero coefficient; a final non-zero coefficient detection unit(e2) for detecting that a final non-zero coefficient has been provided out of non-zero coefficients which are necessary to restore all data to data which corresponds to the original image data; and a first highest value specifying unit(e3) for specifying, based on correspondence information stored by the first correspondence storage unit(e1), a highest coordinate value in each axis corresponding to an order number of a non-zero coefficient detected by the final non-zero coefficient detection unit(e2), and setting the highest coordinate value as one edge of the coordinate range.

The above apparatus does not require a large number of comparative calculations to define the highest values, so that the total time taken to decompress the image data can be reduced.

Also, the n-dimensional inverse transform way be divided into n separate one-dimensional inverse transforms, the non-zero coefficient region specifying unit(e) may include a first specifying unit(e4) for specifying a coordinate range in which the non-zero coefficients are located for one out of the n coordinate axes which compose the n-dimensional coordinate space, for each combination of coordinates in remaining (n−1) coordinate axes, and the inverse transform unit(f) may include: a third inverse transform unit(f3) for performing a one-dimensional inverse transform using only coefficients which belong to the coordinate range specified by the first specifying unit (e4) in the one of the n coordinate axes; and a fourth inverse transform unit(f4) for performing a one-dimensional inverse transform in each of the remaining (n−1) coordinate axes.

The above apparatus omits unnecessary sum of products calculations for zeros, not in the separate axes, but instead for groupings of coordinate values in (n−1) coordinate axes, so that the decompression time can further be reduced.

Also, the n-dimensional inverse transform may be divided into n separate one-dimensional inverse transforms, the non-zero coefficient region specifying unit (e) may include; a second correspondence storage unit(e6) for storing order numbers(i) and, corresponding to each order number, for a supposition that "all coefficients up to and including a present order number are non-zero coefficients", a highest value(ii) in a coordinate axis, selected out of the coordinate axes which compose the n-dimensional coordinate space, for each combination of non-zero coefficients, wherein each combination of non-zero coefficients is formed by grouping together non-zero coordinates when a combination of coordinate values in all but the selected coordinate axis (n−1 coordinate axes) is equal, and a highest value(iii) in each of the remaining (n−1) coordinate axes for all of non-zero coefficients under the supposition; a final non-zero coefficient detection unit(e2) for detecting that a final non-zero coefficient has been provided out of non-zero coefficients which are necessary to restore all data to data which corresponds to the original image data; and a second highest value specifying unit(e7) for specifying, based on correspondence information stored by the second correspondence storage unit(e6), a highest coordinate value for each axis and each combination corresponding to an order number of a non-zero coefficient detected by the final non-zero coefficient detection unit(e2), and setting the highest coordinate value as one edge of the coordinate range, and the inverse transform unit(f) may include: a seventh inverse transform unit (f7) for performing a one-dimensional inverse transform only using coefficients located in the coefficient range specified by the second highest value specifying unit(e7) in the selected coordinate axis; and an eighth transform unit(f8) for performing a one-dimensional inverse transform in each of the remaining (n−1) coordinate axes, using only coefficients located in the coordinate range specified by the second highest value specifying unit(e7).

The above apparatus not only omits the large number of comparative calculations used to define the highest values, but also omits sum of products calculations for zero coordinates for groupings of coordinate values in (n−1) coordinate axes, so that the decompression time for image data can further be reduced.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 4 shows the content of the scan table 2032 of the present apparatus;

FIG. 7 is a figure which shows a specific example of the operation of the comparator 122a of the same apparatus;

FIG. 9 shows the relationship between the detailed configuration of the non-zero coefficient range calculation unit 122 and the other construction elements in the second embodiment of the present invention;

FIG. 10 is a flowchart showing the operation of the comparator 122b of the present apparatus;

FIG. 11 is a figure which shows a specific example of the operation of the comparator 122b of the same apparatus;

FIG. 12(a) shows the DCT coefficients which are to be subjected to the first inverse DCT in the present embodiment;

FIG. 12(b) shows the intermediate values which are to be subjected to the next inverse DCT in the present embodiment;

FIG. 20(a) shows content of a different correspondence table which is generated when the correspondence table 122c of the present apparatus is made more detailed;

FIG. 20(b) shows content of a different correspondence table which is generated when pluralities of zigzag scanning order numbers in the correspondence table shown in FIG. 20(a) are grouped together.

DESCRIPTION OF THE PREFERRED EMBODIMENTS

The following is detailed description of the preferred embodiments of the present invention, with reference to the drawings.

First Embodiment

Summary

The image date decompression apparatus of the first embodiment is characterized by defining lowest values umin, vmin and highest values umax, vmax for each axis, out of the coordinates (u,v) of the non-zero coefficients S'(u,v), and by only performing inverse DCT operations for non-zero coefficients S'(u,v) positioned in the coordinate range (umin≦u≦umax, vmin≦v≦vmax).

Construction

Figure 3:
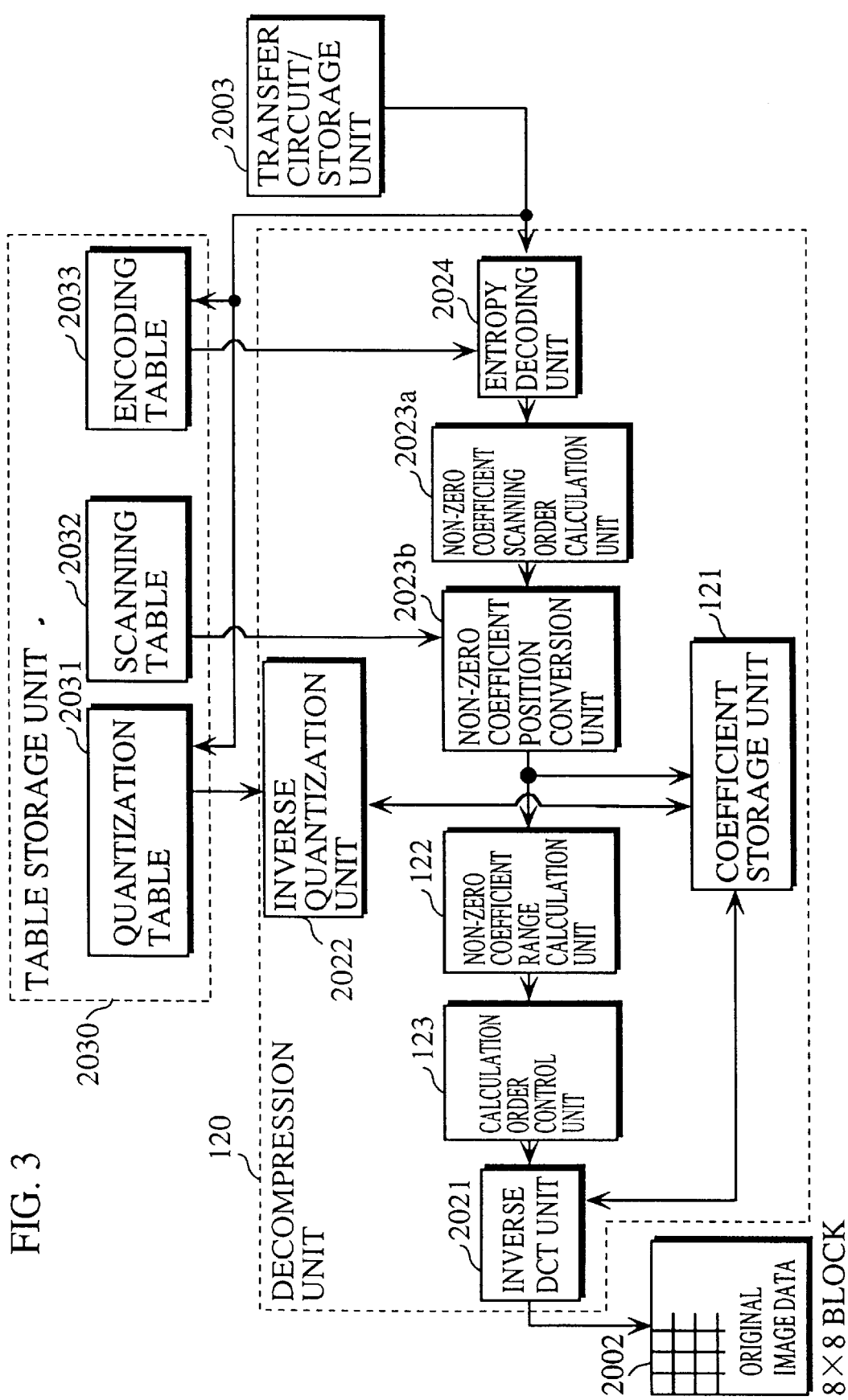
FIG. 3 is a block diagram showing the construction of the image data decompression apparatus of the first embodiment of the present invention.

A block diagram of the present apparatus is shown in FIG. 3. As shown in the figure, the construction of the present apparatus can be roughly divided into a decompression unit 120 and a table storage unit 2030.

Figure 1:
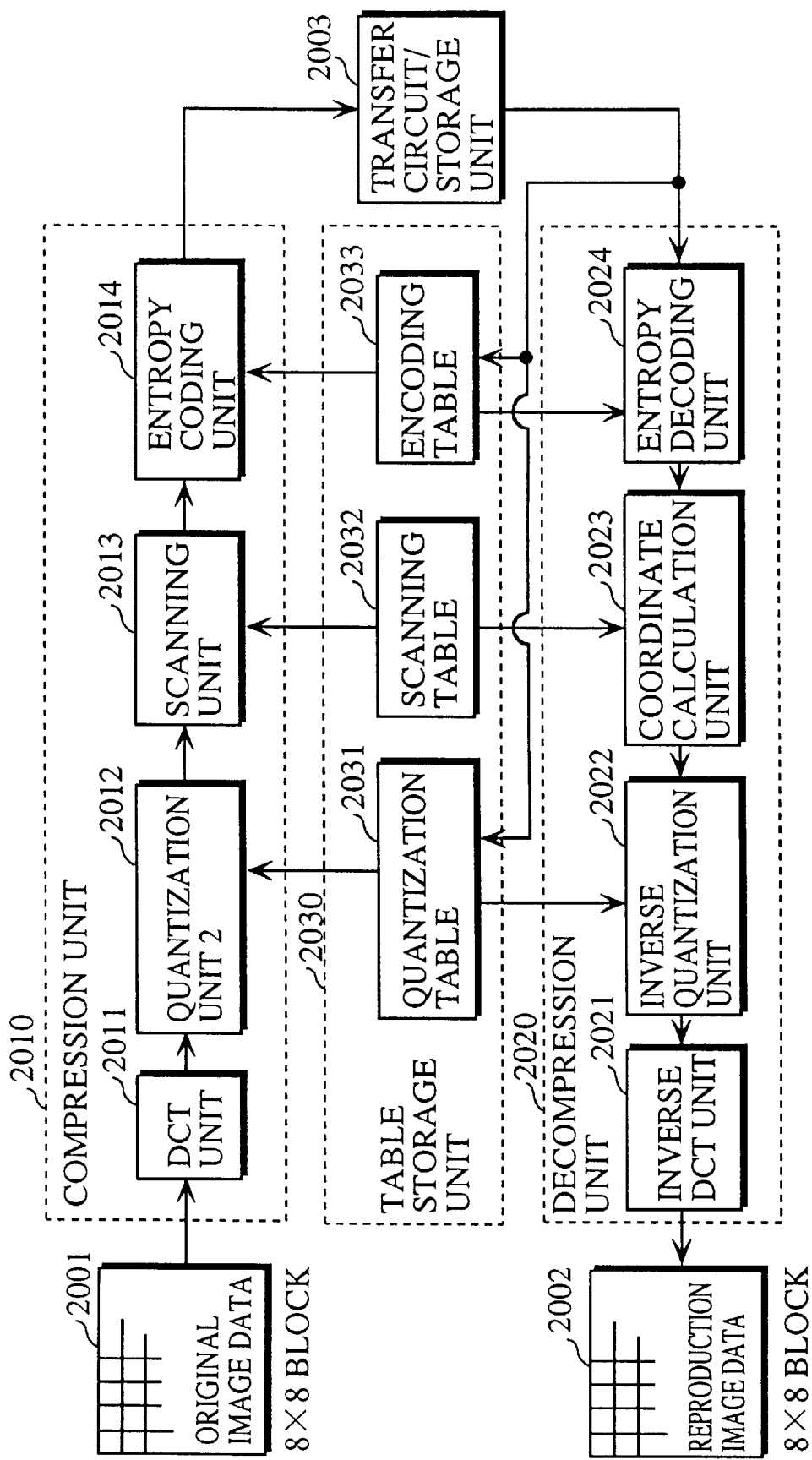
FIG. 1 is a block diagram showing the construction of a conventional image data compression/decompression apparatus.
Figure 2:
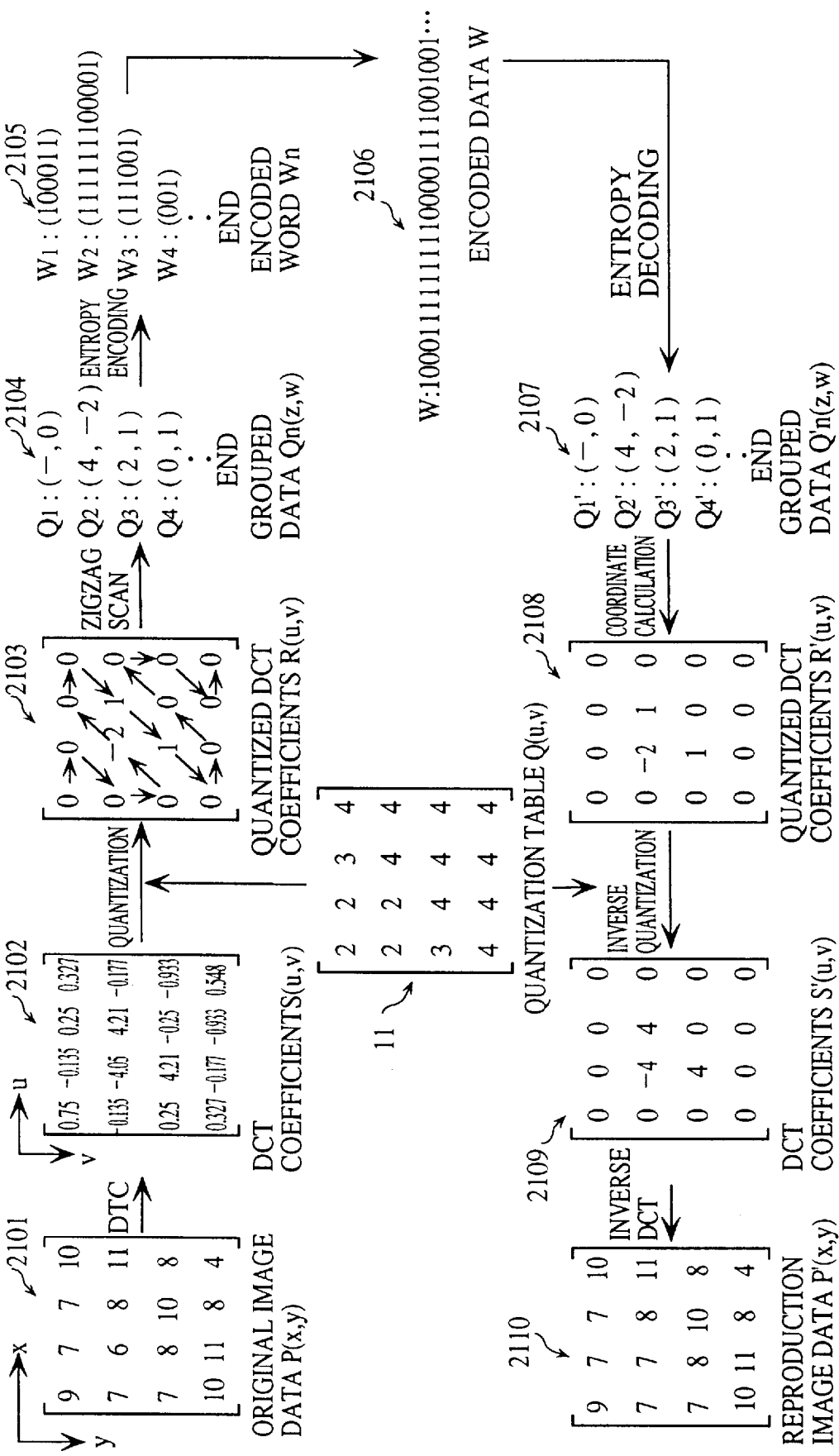
FIG. 2 shows the conversions performed during the compression and decompression of image data.

The decompression unit 120 is made up of an entropy decoding unit 2024, a non-zero coefficient scanning order calculation unit 2023a, a non-zero coefficient position conversion unit 2023b, an inverse quantization unit 2022, a non-zero coefficient range calculation unit 122, a calculation order control unit 123, an inverse DCT unit 2021, and a coefficient storage unit 121. The table storage unit 2030 is made up of a quantization table 2031, a scan table 2032, and an encoding table 2033. Here, construction elements which are the same as those shown in FIG. 1 of the prior art section have been given identical reference numerals and their explanation has been omitted.

The coefficient storage unit 121 is the equivalent of the work memory provided in a conventional device, and has a region for temporarily storing 8*8 DCT coefficients which compose one block.

The non-zero coefficient scanning order calculation unit 2023a and the non-zero coefficient position conversion unit 2023b respectively perform the former and latter half of the processing of the coordinate calculation unit 2023 of the apparatus of the prior art.

The non-zero coefficient range calculation unit 122 specifies regions of non-zero coefficients in the coefficient storage unit 121 which stores the 8*8 DCT coefficients s'(u,v) 2109, and notifies the calculation order control unit 123 of these regions using coordinates expressed as (u,v).

Figure 5:
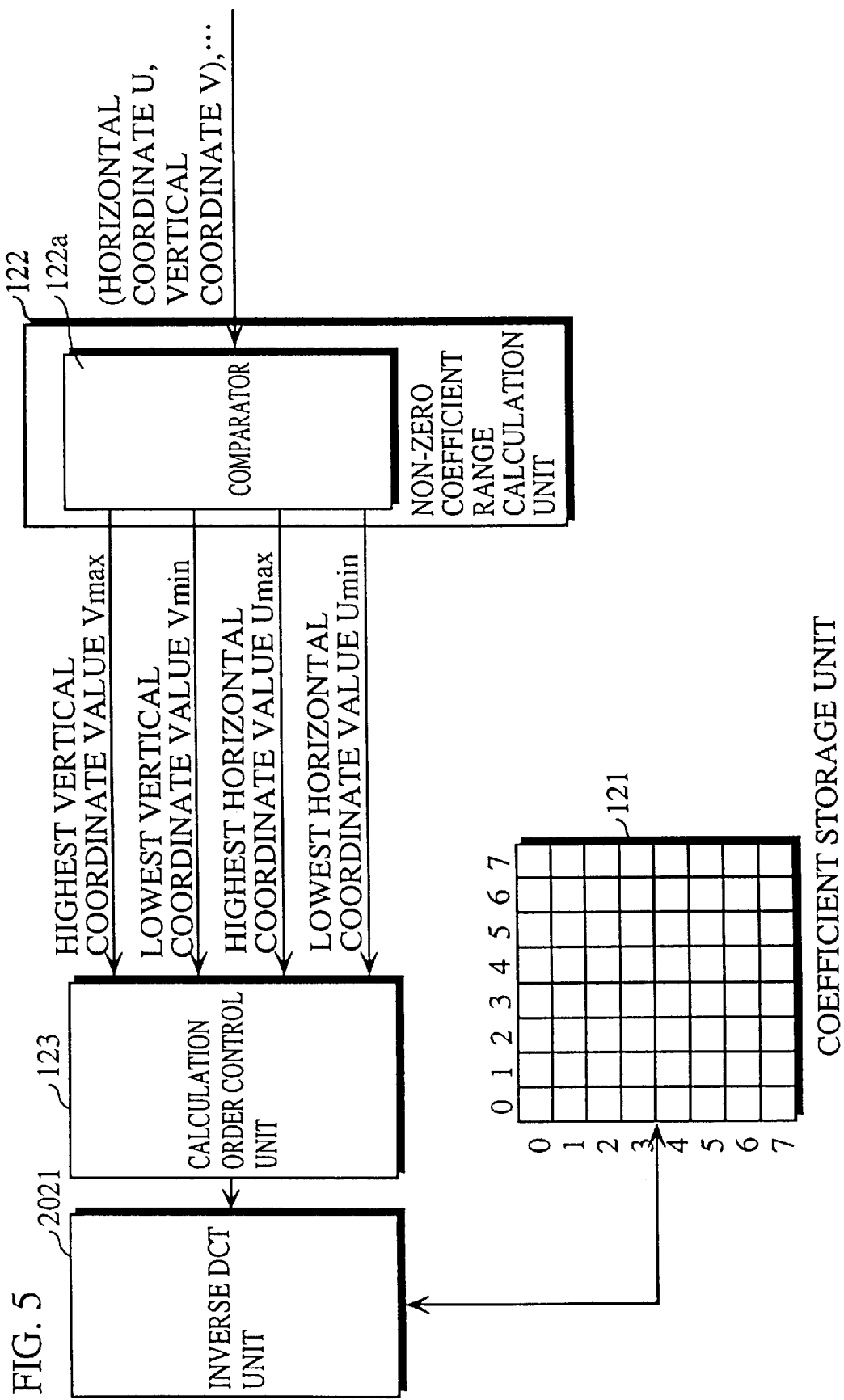
FIG. 5 shows the relationship between the detailed configuration of the non-zero coefficient range calculation unit 122 and the other construction elements.

The relationship between the detailed configuration of the non-zero coefficient range calculation unit 122 and construction elements 123, 2021, and 121 is shown in FIG. 5. As shown in this figure, the non-zero coefficient range calculation unit 122 includes a comparator 122a which is unique to this embodiment and which compares the magnitudes of the coordinates which are obtained from the non-zero coefficient position conversion unit 2023b.

The calculation order control unit 123 controls the inverse DCT unit 2021 to perform inverse DCT based on only the DCT coefficients S'(u,v) which are included in the regions which indicated by the non-zero coefficient range calculation unit 122.

The inverse DCT unit 2021 is fundamentally the same as that provided in a prior art apparatus, except that it performs inverse DCT under the control of the calculation order control unit 123.

It should be noted here that the quantization table 2081, the encoding table 2033, and the coefficient storage unit 121 may be composed of RAM or the like, the scan table 2032 may be composed of ROM or the like, and the other construction elements 2024, 2023a, 2023b, 122, 123, and 2021 may be realized by the combination of a standard CPU (Central Processing Unit) or specialized logic circuits, such as adders, multipliers, comparators, etc., with a control program.

Operation

The following is an explanation of the operation of the present apparatus. This explanation will focus on the case when encoded data W 2106, read by the decompression unit 2020 from the transfer circuit/storage unit 2003, is restored to the final reproduction image data 2002 by a plurality of steps executed by the decompression unit 120, and will describe these processes in the order they are performed. In the same way as the description of the prior art, for convenience's sake the original image data P(x,y) and the reproduction image date P'(x,y) have been set as 4*4 pixel blocks.

In the same way as the prior art example, the entropy decoding unit 2024 refers to the encoding table 2033 to decode the encoded data W 2106 read by the decompression unit 120 from the transfer circuit/storage unit 2003, restoring it to the grouped data Q'n(z,w) 2107.

The non-zero coefficient scanning order calculation unit 2023a calculates the scanning order number from the zero run length z in the grouped data Q'n(z,w) 2107 sent from the entropy decoding unit 2024, and outputs the scanning order number together with the non-zero coefficient w to the non-zero coefficient position conversion unit 2023b. Here, the scanning order number refers to a number starting from the head of a row given when the DCT coefficients are arranged into a single row by zigzag scanning the data during compression.

As a specific example, when given the first grouped data Q'1(−,0), the non-zero coefficient scanning order calculation unit 2023a calculates "1" as the scanning order number of the "0" non-zero coefficient from "−". When given the second grouped data Q'2(4,−2), the non-zero coefficient scanning order calculation unit 2023a calculates "5" (=4+1) as the scanning order number of the "−2" non-zero coefficient from the "4" in (4,−2). Similarly, when given the third grouped data Q'3(2,1), the non-zero coefficient scanning order calculation unit 2023a calculates "8" (=5+2+1) as the scanning order number of the "1" non-zero coefficient from the "2" in (2,1). These calculated scanning order numbers are outputted together with the respective non-zero coefficients.

On receiving a pair of a scanning order number and a non-zero coefficient outputted from the non-zero coefficient scanning order calculation unit 2023a, the non-zero coefficient position conversion unit 2023b refers to the content of the scan table 2032 and converts the scanning order number to a non-zero coefficient position (u,v) which it outputs to the non-zero coefficient range calculation unit 122, in addition to storing the received non-zero Coefficient at an address in the coefficient storage unit 121 which corresponds to its non-zero coefficient position (u,v). Here, the non-zero coefficient position (u,v) is a set of two-dimensional coordinates which show the position of non-zero coefficient in an 8*8 block.

FIG. 4 shows the content of the scan table 2032 which shows the coordinates (u,v) which correspond to the scanning order numbers. As specific examples of the operation of the present apparatus, the non-zero coefficient position conversion unit 2023b refers to the scan table 2032 shown in FIG. 4 and writes the value "0" at the address in the coefficient storage unit 121 corresponding to the coordinates (0,0) when given the scanning order number "1" and the non-zero coefficient "0", and writes the value "−2" at the address corresponding to the coordinates (0,2) when given the scanning order number "4" and the non-zero coefficient "−2". It should be noted that the coordinate calculation unit 2023 initializes the coefficient storage unit 121 by writing zeros into all of the storage addresses before beginning the storage of non-zero coefficients.

By means of the above operation, the processing by the non-zero coefficient scanning order calculation unit 2023a and non-zero coefficient position conversion unit 2023b for all of the grouped data Q'n(z,w) 2107 which forms one pixel block is completed, resulting in the generation of the sixteen quantized DCT coefficients R'(u,v) 2108 shown in FIG. 4.

In the same way as in the prior art example, the inverse quantization unit 2022 reads all of the quantized DCT coefficients R'(u,v) 2108 stored in the coefficient storage unit 121 and, as shown by Equation 3, performs inverse quantization using the quantization step size Q(u,v) stored in a corresponding position in the quantization table 2031 and restores the result in the coefficient storage unit 121. As a result, all of the quantized DCT coefficients R'(u,v) stored in the coefficient storage unit 121 are restored to DCT coefficients S'(u,v) 2109.

As shown in FIG. 5, the comparator 122a in the non-zero coefficient range calculation unit 122 find the highest values umax, vmax and the lowest values umin, vmin in the respective coordinate axes u,v, out of all of the non-zero coefficient positions (u,v) which form one block sent from the non-zero coefficient position conversion unit 2023b. As a result, it is established, for example, that there are no non-zero coefficients whose u coordinate is lower than umin and no non-zero coefficients whose u coordinate is higher than umax in the block.

Figure 6:
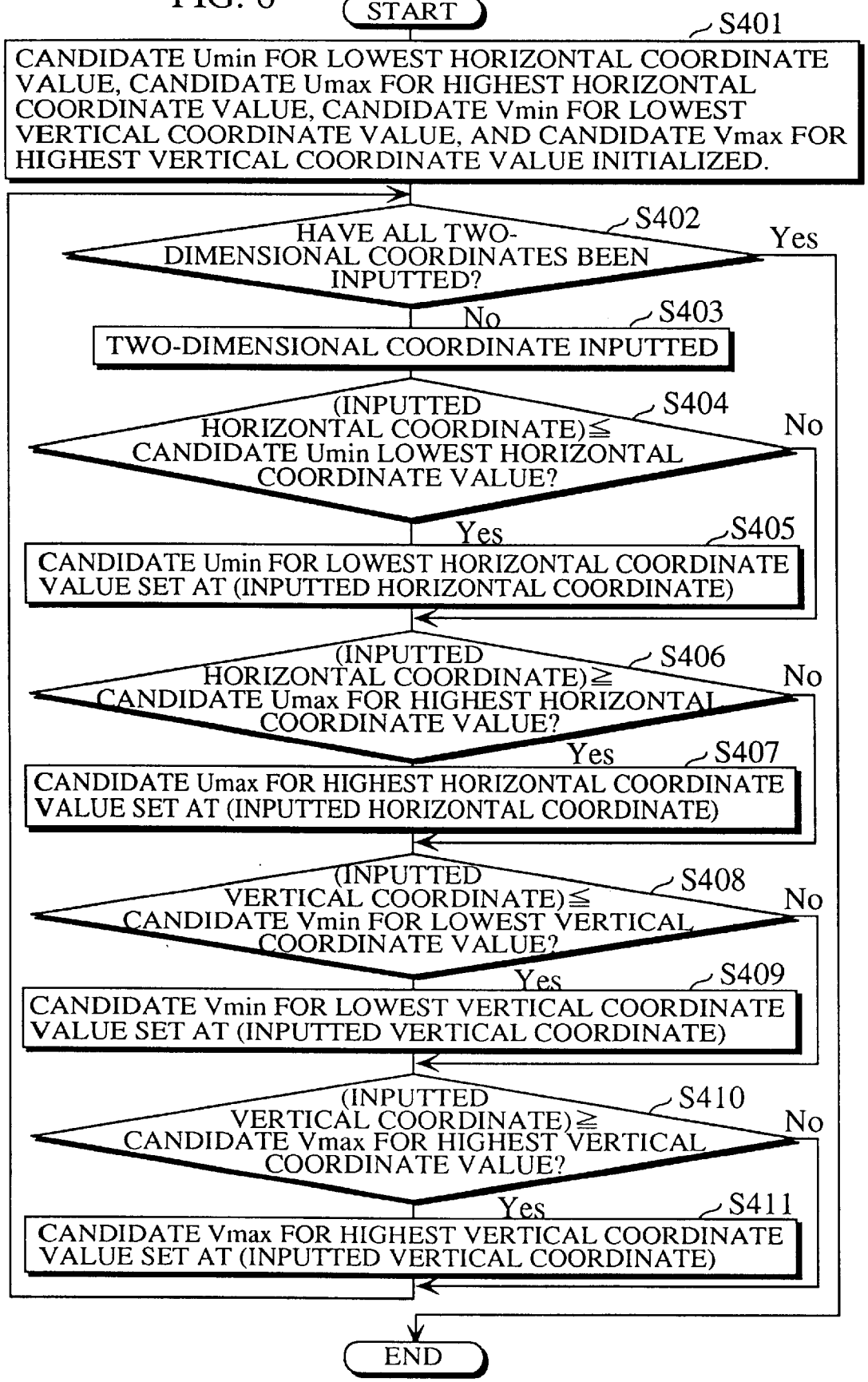
FIG. 6 is a flowchart showing the operation of the comparator 122a of the present apparatus.

The operation of the comparator 122a is shown by the flowchart in FIG. 6. The comparator 122a first initializes the candidates of the respective highest and lowest values in the horizontal (u) and vertical (v) axes (step S401) and compares the value of each coordinate u,v in each non-zero coordinate position (u,v) successively provided by the non-zero coefficient position conversion unit 2023b with these candidates (steps S402–S411). By doing so, the lowest horizontal coordinate value umin (steps S404–S405), the highest horizontal coordinate value umax (steps S406–S407), the lowest vertical coordinate value vmin (steps S408–S409), and the highest vertical coordinate value vmax (stops S410–S411) can be found.

A specific example of the operation of the comparator 122a is shown in FIG. 7. Column 501 shows the non-zero coefficient positions (u,v) which are successively provided by the non-zero coefficient position conversion unit 2023b. Columns 502 and 505 show the separate horizontal u and vertical v coordinates of these non-zero coefficient positions (u,v).

Columns 503, 504, 506, and 507 show the results of the comparisons performed by the comparator 122a for these non-zero coordinate positions, and respectively show the lowest horizontal coordinate value umin, the highest horizontal coordinate value umax, the lowest vertical coordinate value vmin, and the highest vertical coordinate value vmax. By setting the initial values in the row 508 as 8, −1, 8, −1, all of the non-zero coefficients can be compared using a consistent judgement method (in steps S404–S411).

Row 509 shows the final results for umin, umax, vmin, and vmax of the comparisons performed by the comparator 122a for the four non-zero coefficients given in the figure.

The inverse DCT unit 2021 than performs two-dimensional inverse DCT under the control of the calculation order control unit 123 which converts the 8*8 DCT coefficients S'(u,v) 2109 in the coefficient storage unit 121 into the final 8*8 reproduction image data P'(x,y) 2110. It should be noted here that this two-dimensional inverse DCT is performed as a one-dimensional inverse DCT in the horizontal direction and a one-dimensional Inverse DCT in the vertical direction.

During the processing for the inverse DCTs, the calculation order control unit 123 performs control so that the inverse DCT unit 2021, in performing a one-dimensional inverse DCT in the horizontal direction, only performs sum of products calculations for the DCT coefficients S'(u,v) 2109 which have horizontal (u) coordinates in the range (umin≦u≦umax) between the lowest value and highest value calculated by the non-zero coefficient range calculation unit 122, and, in performing a one-dimensional inverse DCT in the vertical direction, only performs sum of products calculations for the DCT coefficients S'(u,v) 2109 which have vertical (v) coordinates in the range (vmin≦v≦vmax) between the lowest value and highest value calculated by the non-zero coefficient range calculation unit 122.

As a result of this control, the inverse DCT unit 2021 first performs a one-dimensional inverse DCT in the horizontal direction according to Equation 7 and then a one-dimensional inverse DCT in the vertical direction according to Equation 8.

Equation 7 when (x=0,1,2,3; vmin≦v≦vmax)

$$G(x,v) = \frac{1}{\sqrt{2}} \sum_{u=umin}^{umax} C(u)S'(u,v)\cos\frac{(2x+1)u\pi}{8}$$

Equation 8

$$P'(x,y) = \frac{1}{\sqrt{2}} \sum_{v=vmin}^{vmax} C(v)G(x,v)\cos\frac{(2y+1)v\pi}{8}$$

when (x=0,1,2,3; y=0,1,2,3)

Figure 8B:
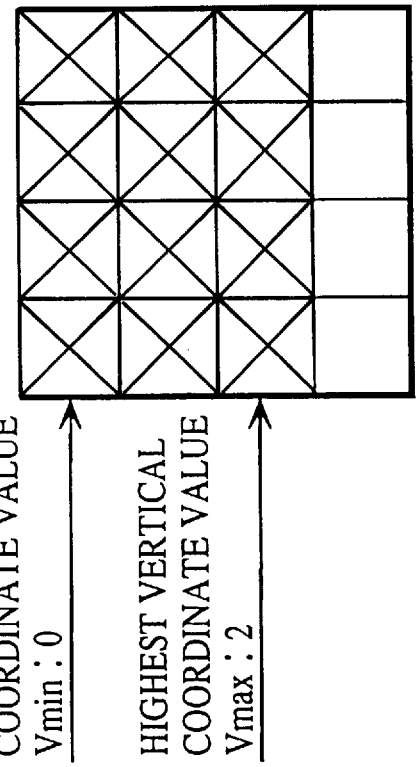
FIG. 8(b) shows the intermediate values which are to be subjected to the next inverse DCT in the present embodiment.
Figure 8A:
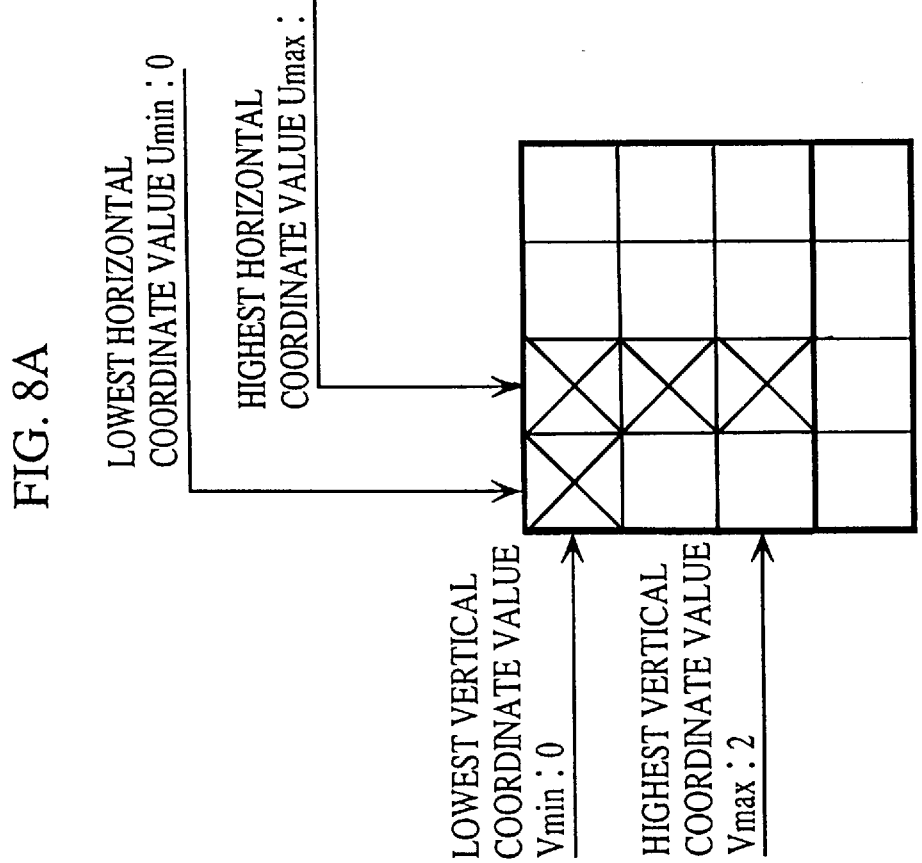
FIG. 8(a) shows the DCT coefficients which are to be subjected to the first inverse DCT in the present embodiment.

FIGS. 8(a) and 8(b) show specific examples of the repetitions of the sum of products calculations in Equations 7 and 8. FIG. 8(a) shows one block of DCT coefficients stored in the coefficient storage unit 121 before an inverse DCT is performed, while FIG. 8(b) shows the intermediate values stored in the coefficient storage unit 121 immediately after one-dimensional inverse conversion in the horizontal axis, which is to say, calculation according to Equation 7. The white parts of the figures show areas where the value is zero, while the x-marked part show areas where the values are not zero.

When the DCT coefficients S'(u,v) 2109 are given as shown in FIG. 8(a), the non-zero coefficient range calculation unit 122 calculates umin=0, umax=1, vmin=0, and vmax=2. Following this, the calculation order control unit 123 controls the inverse DCT unit 2021 to perform an inverse DCT based on these four values. As a result, the inverse DCT unit 2021 first performs sum of products calculations in accordance with Equation 7 for the DCT coefficients for v=0,1, 2 and u=0,1, which is to say the six points S'(0,0), S'(1,0), S'(0,1), S'(1,1), S'(0,2), and S'(1,2). In doing so, the inverse DCT unit 2021 calculates the twelve intermediate values G(x,v) shown by the x-marked part of FIG. 8(b). Following this, the inverse DCT unit 2021 performs sum of products calculations for only these twelve intermediate values G(x,v) in accordance with Equation 8.

By operating as described above, the present apparatus manages to avoid sum of product calculations for zeros which were performed by conventional apparatuses, which is to say unnecessary calculation where the result is obvious. Here, the present apparatus avoids only sum of product calculations for zeros, so that it should be clear that the reproduction image data restored by the present apparatus is identical to the reproduction image data restored by a conventional apparatus executing sum of product calculations for all of the DCT coefficients.

As a specific evaluation of the degree to which sum of products may be avoided by the present apparatus, when both coordinates u and v range from 0 to 3, the present apparatus can complete the calculation according to Equation 7 using only 24 (=6*4) sum of products calculations (as opposed to 64) and the calculation according to Equation 8 using only 48 (=12*4) sum of products calculations (as opposed to 64). As a result, in the present example the present apparatus needs only 72 calculations, as opposed to the 128 calculations required by a conventional apparatus.

Investigation

When compared to a conventional apparatus, the present apparatus is able to achieve the same reproduction image data with a reduced amount of necessary sum of products calculations, although a new process, namely comparative calculation by the comparator 122a, is required. As a result, when comparing the processing time required to decompress one block of encoded data W2106, for the present apparatus it is necessary to consider the time required for both the sum of products calculations and the comparative calculation, which raises the question as to whether the present apparatus reduces the necessary processing time in every situation.

It has been established that the various kinds of images described below that use the present apparatus reduces the processing time necessary to decompress the image data.

As one example, nature scenes photographed using a camera tend to exhibit a smooth and gradual transition of color in their spatial directions. This means these images include many low frequency components of spatial frequencies and few high frequency components. As a result the values of the DCT coefficients obtained from such image data tend to be large for low frequency components and small for high frequency components. When such DCT coefficients are quantized into integers, many of the high frequency components are converted to zero.

In order to cut the unnecessary high frequency components from natural images and the like to reduce the amount of information, there are many cases where the quantization step size for high frequency components is set larger then that for low frequency components, no that many of the DCT coefficients for high frequency components and up at zero. This further goes to prove that the JPEG method is an encoding method which can achieve a high compression rate.

As described above, the quantized DCT coefficients for many kinds of images are zero. Accordingly, there is a low number of sets of grouped data which compose each block, so that the number of comparative calculations performed by the comparator 122a is reduced and the frequency with which sum of products calculations for zeros can be omitted is increased.

As a result, the processing time for the decompression of a great variety of image data can be reduced using the present apparatus.

The present embodiment describes the case when the two-dimensional inverse DCT is performed by first performing a one-dimensional inverse DCT in the horizontal direction using Equation 7, and then performing a one-dimensional inverse DCT in the vertical direction using Equation 8, although this order need not be used. The same results and effects can also be obtained if a one-dimensional inverse DCT is performed in the vertical direction (v axis) using Equation 9, and then performing a one-dimensional inverse DCT in the horizontal direction (u axis) using Equation 10.

Equation 9

$$H(u,y) = \frac{1}{\sqrt{2}} \sum_{v=v\min}^{v\max} C(v)S'(u,v)\cos\frac{(2y+1)v\pi}{8}$$

when (umin≦u≦umax; y=0,1,2,3)

Equation 10

$$P'(x,y) = \frac{1}{\sqrt{2}} \sum_{u=u\min}^{u\max} C(u)H(u,y)\cos\frac{(2x+1)u\pi}{8}$$

when (x=0,1,2,3; y=0,1,2,3)

This is based on the nature of the n-dimensional inverse DCT, which is to say that is possible to divide an n-dimensional inverse DCT into one-dimensional inverse DCTs in each axial direction and that these divided one-dimensional inverse DCTs are commutative (which is to say that result of n-dimensional inverse DCT is unaffected by the order in which the composite one-dimensional inverse DCTs are performed).

The present apparatus is described as specifying the lowest values umin, vmin and the highest values umax, vmax in each taxis from the coordinates (u,v) for the non-zero coefficients S'(u,v) and only performing an inverse DCT for non-zero coefficients S'(u,v) located in the range (umin≦u≦umax, vmin≦v≦vmax), although the specifying process may be simplified so that only the highest value in each axis is specified. In other words, the highest values umax, vmax may be specified in each axis from the coordinates (u,v) for the non-zero coefficients S'(u.v), and an inverse DCT for non-zero coefficients S'(u,v) located in the range (0≦u≦umax, 0≦v≦vmax) may be performed. When doing so, both lowest values specified by the comparator 122a of the present apparatus are zero, which is the same as when the lowest values correspond to the first coordinate value.

This method makes use of the characteristic that image data generally includes a large number of low frequency components, so that many of the DCT coefficients S'(u,v) in positions with low coordinate values in each of the u and v axes are zero. This is to say, since there are many cases when the lowest values umin, vmin of the coordinates of the range of non-zero coordinates are zero, the process for establishing the largely unnecessary lowest values can be omitted, thereby reducing the comparative calculation performed by the comparator 122a to just the calculation of the highest values.

In the present embodiment, the inverse quantization unit 2022 reads all of the quantized DCT coefficients R'(u,v) 2106 stored in the coefficient storage unit 121 in order and performs inverse quantization, although it may instead perform inverse quantization for only the non-zero coefficients, or base the inverse quantization on the results of the non-zero coefficient range calculation unit 122.

As described above, the present apparatus is able to omit unnecessary calculations in the inverse quantization process, although since this increase in speed in the inverse quantization process does not form the gist of the present invention, it is not described in detail.

Second Embodiment

Summary

The following is an explanation of the image data decompression apparatus of the second embodiment of the present invention. While the apparatus of the first embodiment specified lowest values umin, vmin and highest values umax, vmax in each of the coordinate axes (u,v) for the non-zero coefficients S'(u,v), the present apparatus is characterized by finding the lowest vmin and highest vmax values in the v axis as before, but then finding a separate lowest value umin and highest value umax for each different value v and performing an inverse DCT for only the non-zero coefficients S'(u,v) which are located in the specified coordinate range (vmin≦v≦vmax, for each value v umin≦u≦umax).

Construction

The basic construction of the present apparatus is the same as that shown in FIG. 3, making it the same as the apparatus of the first embodiment. However, the detailed construction of the non-zero coefficient range calculation unit 122 and the specific operation of the calculation order control unit 123 are different. The following explanation will focus on these differences with the apparatus of the first embodiment.

The relationship between the detailed construction of the non-zero coefficient range calculation unit 122 and construction elements 123, 2021, and 121 is shown in FIG. 9.

As shown in the drawing, non-zero coefficient range calculation unit 122 of the present apparatus includes a unique comparator 122b which compares the magnitude of coordinate values obtained from the non-zero coefficient is position conversion unit 2023b.

The calculation order control unit 123 controls the inverse DCT unit 2021 to perform inverse DCT based on only the DCT coefficients S'(u,v) which are included in the regions indicated by the comparator 122b in the same way as in the first embodiment, except that the content of this indication from the comparator 122b is different to the first embodiment.

Operation

The following is an explanation of the operation of the present apparatus. Note here that the operation of the entropy decoding unit 2024, the non-zero coefficient scanning order calculation unit 2023a, the non-zero coefficient position conversion unit 2023b, and the inverse quantization unit 2022 are the same as in the first embodiment, so that the following explanation will begin with the operation of the non-zero coefficient range calculation unit 122.

As shown in FIG. 9, the comparator 122b of the non-zero coefficient range calculation unit 122 finds the lowest value vmin and the highest value vmax, and the lowest value umin (at v=vmin, . . . , vmax) and the highest value umax (at v=vmin, . . . , vmax) for each coordinate value v (vmin≦v≦vmax) in that range, from all of the non-zero coordinate positions (u,v) which compose one block sent from the non-zero coefficient position conversion unit 2023b. It then informs the calculation order control unit 123 of its results. In the following explanation, umin (at v−k) and umax (at v−k) are respectively shortened to umin(k) and umax(k).

FIG. 10 is a flowchart showing the operation of the comparator 122b which corresponds to FIG. 6 in the first embodiment.

The comparator 122b first initializes all of the candidates of the lowest and highest values (stop S801) and compares each of the coordinates u,v for each non-zero coordinate position (u,v) successively obtained from the non-zero coefficient position conversion unit 2023b, with these candidates (steps S802–S811). By doing so, candidates umin (0), . . . , (7) for the lowest horizontal coordinate value for each v coordinate (steps S804–S805), candidates umax (0), . . . , (7) for the highest horizontal coordinate value for each v coordinate (steps S806–S807), a candidate for the lowest vertical coordinate value vmin (steps S808–S809), and a candidate for the highest vertical coordinate value vmax (steps S810–S811) can be found.

FIG. 11 shows the specific operation of the comparator 122b and corresponds to FIG. 7 of the first embodiment. Column 901 shows the non-zero coefficient positions (u,v) which are successively provided by the non-zero coefficient position conversion unit 2023b. Columns 902–907, 908 and 909 show the results of the comparisons performed by the comparator 122a for these non-zero coordinate positions, and respectively show the lowest horizontal coordinate value umin(0) when v=0, the highest value umax(0), the lowest horizontal coordinate value umin(1) when v=1, the highest value umax(1), the lowest horizontal coordinate value umin(7) when v=7, the highest value umax(7), and the lowest and highest vertical coordinate values vmax and vmin. Here, the initial values 910 and the final values 911 are the same as in the first embodiment.

The inverse DCT unit 2021 then performs two-dimensional inverse DCT under the control of the calculation order control unit 123 by performing a one-dimensional inverse DCT in the horizontal direction and a one-dimensional inverse DCT in the vertical direction. Here, the data subjected to this inverse DCT, DCT coefficients S'(u,v), is different to the first embodiment.

During the processing for the inverse DCTs, the calculation order control unit 123 performs control so that the inverse DCT unit 2021, in performing a one-dimensional inverse DCT in the horizontal direction, only performs sum of products calculations for the DCT coefficients S'(u,v) 2109 which have horizontal (u) coordinates in the range (umin(v)≦u≦umax(v)) between the lowest value and highest value for the v coordinate calculated by the non-zero coefficient range calculation unit 122, and, in performing a one-dimensional inverse DCT in the vertical direction, only performs sum of products calculations for the DCT coefficients S'(u,v) 2109 which have vertical (v) coordinates in the range (vmin≦v≦vmax) in the same way au in the first embodiment.

As a result of this control, the inverse DCT unit 2021 first performs a one-dimensional inverse DCT in the horizontal direction according to Equation 11 and then a one-dimensional inverse DCT in the vertical direction according to Equation 8. This is to say, the present apparatus performs a calculation using Equation 11 in place of Equation 7 which was used in the first embodiment.

Equation 11

$$G(x,v) = \frac{1}{\sqrt{2}} \sum_{u=u\min(v)}^{u\max(v)} C(u)S'(u,v)\cos\frac{(2x+1)u\pi}{8}$$

when (x=0,1,2,3; vmin≦v≦vmax)

FIGS. 12(a) and 12(b) show specific repetitions of the sum of products calculations according to Equations 8 and 11, and correspond to FIGS. 8(a) and 8(b) in the first embodiment.

Here, when the non-zero coefficient range calculation unit 122 is provided with the DCT coefficients S'(u,v) 2109 shown in FIG. 12(a), the values umin(0)=0, umax(0)=1, umin(1)=1, umax(1)=1, umin(2)=1, umax(2)=1, vmin-0 and vmax =2 are calculated. The calculation order control unit 123 then has the inverse DCT unit 2021 perform sum of products calculations based on these six values. As a result, the inverse DCT unit 2021 performs sum of products for u=0,1 for v=0, u=1 for v=1 and u=1 for v=2, which is to say, for only the four DCT coefficients S'(0,0), S'(1,0), S'(1,1), and S'(1,2). This can be seen to be two less points then were used when performing calculation according to Equation 7 (six points) in the first embodiment.

Here, the intermediate values G(x,v) obtained as a result of the calculation using Equation 11 are the twelve points shown in FIG. 12(b) which correspond to those given in the first embodiment. As a result, the number of sum of products which need to be performed according to Equation 8 is the same as in the first embodiment.

It should be noted here that while comparator 122b of the present embodiment was described as finding a lowest value vain and the highest value vmax in the v axis and a separate lowest value umin and highest value umax for each of these v values (vmin≦v≦vmax) in the u axis, it should be obvious that the same results will be obtained if the process is performed with the u and v coordinates the other way round.

In the same way as the first embodiment, it is also possible to conceive a simplification of the specifying process for the coordinate range in which the non-zero coefficients S'(u,v) are located. In other words, only the highest value vmax may be specified in the v axis and only the highest values umax () may be specified in the u axis for each v coordinate (0≦v≦vmax) from the coordinates (u,v) for the non-zero coefficients S'(u,v). An inverse DCT for non-zero coefficients S'(u,v) located in the range (0≦u≦umax( ), 0≦v≦vmax) may then be performed. When doing so, both lowest values specified by the comparator 122a of the present apparatus are zero, which frees the comparator 122a from calculating the often unnecessary lowest values and thereby reduces its calculation load.

Third Embodiment
Summary

The following is an explanation of the image data decompression apparatus of the third embodiment of the present invention. In the first and second embodiments, the order of the coordinate axes which are used in performing one dimensional inverse DCT is fixed (first U, then v), while the present embodiment is characterized by dynamically changing this order depending on the content of the DCT coefficients with which it is provided.

Construction

The basic construction of the present apparatus is the same as that shown in FIG. 3, making it the same as the apparatus of the first embodiment. Also, the detailed construction of the non-zero coefficient range calculation unit 122, which is to say the provision of comparator 122a, is also the same. The difference, however, lies in the specific operation of the calculation order control unit 123. The following explanation will focus on these differences with the apparatus of the first embodiment.

Figure 13:
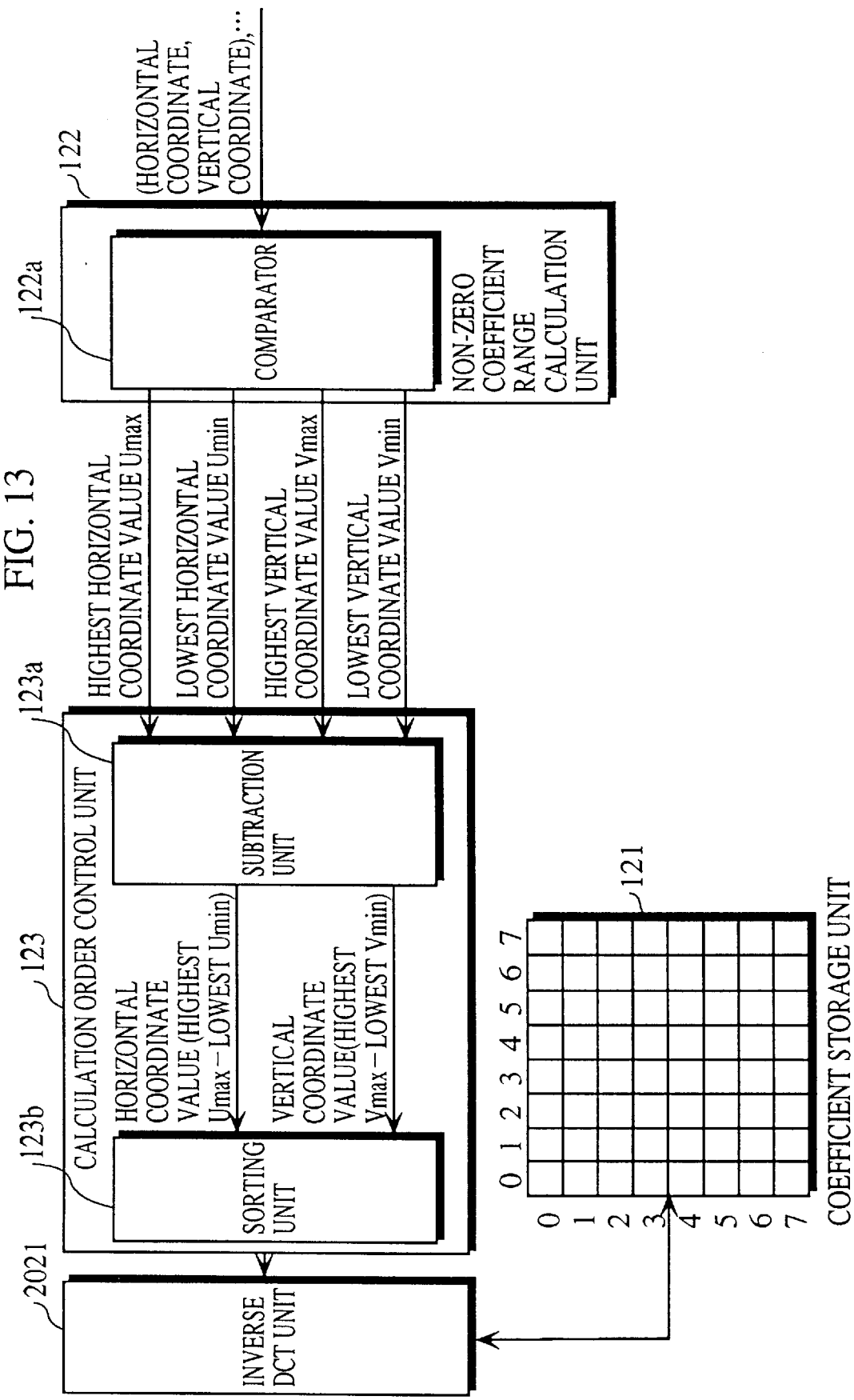
FIG. 13 shows the relationship between the detailed configuration of the calculation order control unit 123 and the other construction elements in the third embodiment of the present invention.

The relationship between the detailed construction of the calculation order control unit 123 and construction elements 122, 2021, and 121 is shown in FIG. 13.

The calculation order control unit 123 is the same as in the first embodiment in that it controls the calculation order of the inverse DCT unit 2021 based on the respective highest and lowest values in the horizontal and vertical axes which it receives from the comparator 122a, but differs, as shown in FIG. 13, in that it includes a subtraction unit 123a and a sorting unit 123b in addition to the functions provided in the first embodiment. These functions of subtracting and sorting, and the execution of on inverse DCT based on their results, are unique to the present embodiment.

Operation

The following is an explanation of the operation of the present apparatus.

The subtraction unit 123a receives four values which are the highest and lowest coordinate values in the horizontal axis, umax and umin, and the highest and lowest coordinate values in the vertical axis, umax and umin, and calculates the difference in each axis between the highest coordinate value and the lowest coordinate value to give Δu (=umax−umin) and Δv (=vmax−vmin).

The sorting unit 123b then arranges the values Δu and Δv calculated by the subtraction unit 123a into descending order. The calculation order control unit 123 then controls the inverse DCT unit 2021 to perform one dimensional inverse DCTs in each axis in the order given by the sorting unit 123b. As a result, the inverse DCT unit 2021 performs an inverse DCT for the DCT coefficients S'(u,v) 2109 in the range (umin≦u≦umax, vmin≦v≦vmax), with the order of the axes when performing one-dimensional inverse DCT, which is to say whether calculation is performed according to Equation 8 after Equation 7 or according to Equation 10 after Equation 9, being decided by the control of the calculation order control unit 123.

Figure 14B:
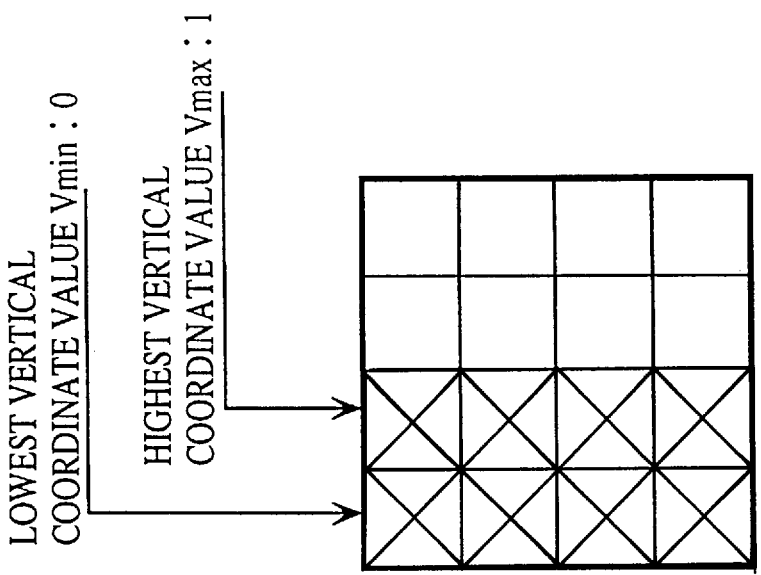
FIG. 14(b) shows the intermediate values which are to be subjected to the next inverse DCT in the present embodiment.
Figure 14A:
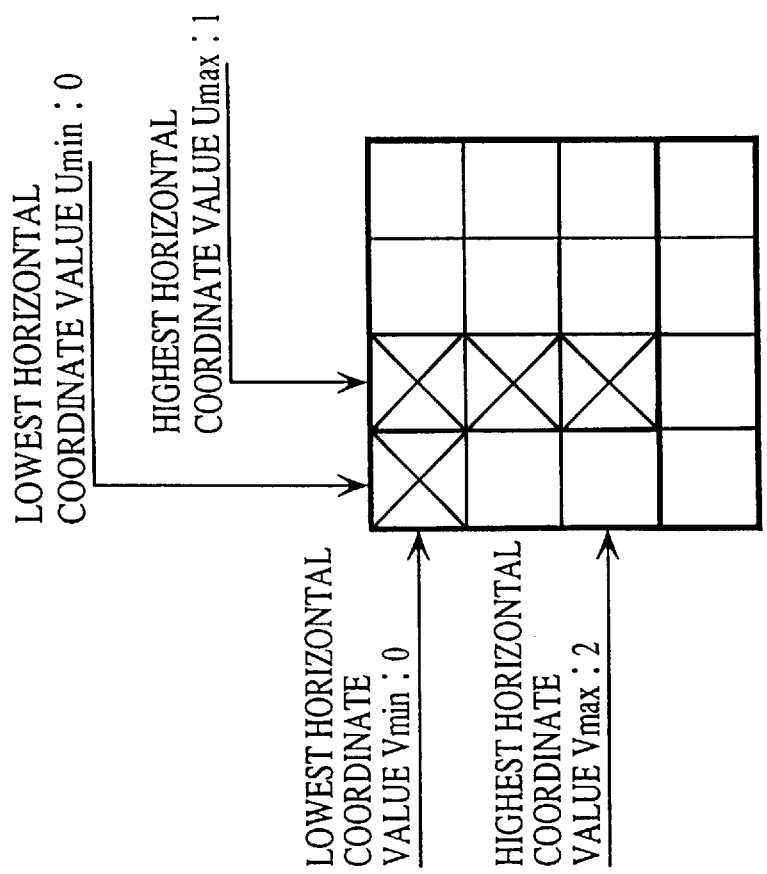
FIG. 14(a) shows the DCT coefficients which are to be subjected to the first inverse DCT in the present embodiment.

FIGS. 14(a) and 14(b) show specific repetitions of the sum of products calculations by the inverse DCT unit 2021 under the control of the calculation order control unit 123, and correspond to FIGS. 8(a) and 8(b) in the first embodiment.

When the DCT coefficients S'(u,v) 2109 are as shown in FIG. 14(a), the comparator 122a calculates umin–0, umax=1, vmin=0, and vmax=2, in the same way as in the first embodiment.

The subtraction unit 123a then calculates Δu =1) and ΔV (=2) based on these four values.

The sorting unit 123b arranges Δu and Δv into descending order, which is to say it puts Δu after Δv.

The calculation order control unit 123 controls the inverse DCT unit 2021 so that it performs inverse DCT based on the order of axes calculated by the sorting unit 123b. As a result, the inverse DCT unit 2021 performs a one-dimensional inverse DCT in the v direction (using Equation 9) to give the intermediate values G(x,v) shown by the x-marked part of FIG. 14(b), before performing a one-dimensional inverse DCT in the u direction (using Equation 10).

As a result, while the first embodiment performed sum of products calculations for 6 values according to Equation 7 and performed sum of products calculations for 12 intermediate values according to Equation 8, the present embodiment performs sum of products calculations for 6 values according to Equation 9 and performs sum of products calculations for 10 intermediate values according to Equation 10. Consequently, when compared to the first embodiment, while the present embodiment merely changes the order of the axes in which a one-dimensional inverse DCT is performed, this results in a reduction in the necessary number of sum of products calculations in the latter of the one-dimensional inverse DCTs.

The above difference is caused by the mathematical properties of the way in which the positions of the intermediate values extend across the entire one-dimensional region, which can be seen from Equations 7 and 8 or Equations 9 and 10. When the two-dimensional region defined by the vertices umax, umin, vmax, and vmin is not square but rectangular in the present embodiment, the axis with the longer sides is given preference and is used in the first one-dimensional inverse DCT. In this way, by first performing a one-dimensional inverse DCT in an axis which can reduce the area in the coordinate space which needs to be calculated, the extant of the non-zero coefficients can be suppressed and the number of sum of products calculations can be reduced.

As described above, the present apparatus can omit sum of products calculations, which is to say unnecessary calculations where the result is obviously zero, for zeros which are performed by conventional apparatuses.

As with the first embodiment, the process for specifying the coordinate region in which the non-zero coefficients S'(u,v) are located can be simplified as described below. In other words, only the highest value vmax may be specified in the v axis and only the highest value umax may be specified in the u axis from the coordinates (u,v) for the non-zero coefficients S'(u,v). These values vmax, umax are then sorted and one-dimensional inverse DCTs are performed in the given order. When doing so, subtraction by the subtraction unit 123a is no longer necessary, so that the necessary processing by the calculation order control unit 123 can be reduced.

Fourth Embodiment

Summary

While first to third embodiments are characterized by performing a comparison for specifying the coordinate range of the non-zero coefficients which are to be subjected to an inverse DCT, the present embodiment is characterized by referring to a lookup table in place of the comparison operation.

Construction

Figure 15:
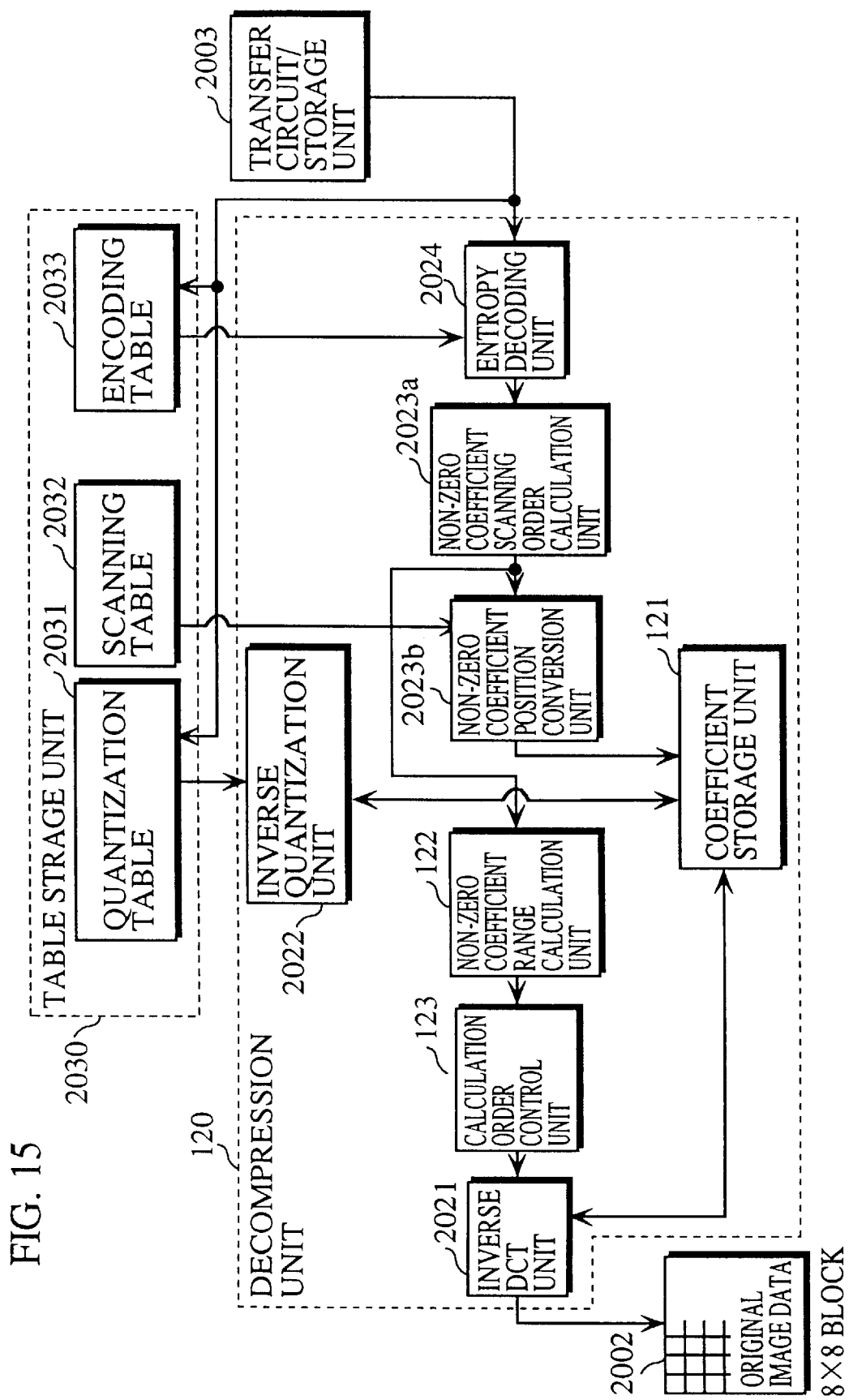
FIG. 15 is a block diagram showing the construction of the image data decompression apparatus of the fourth embodiment of the present invention.

FIG. 15 is a block diagram showing the entire construction of the present apparatus.

The present apparatus differs from the apparatus of the first embodiment, shown in FIG. 3, in only the connections between the elements, with the output of the non-zero coefficient position conversion unit 2023b not being connected to the non-zero coefficient range calculation unit 122, and instead the output of the non-zero coefficient scanning order calculation unit 2023a being connected to the non-zero coefficient range calculation unit 122. The detailed configuration of the non-zero coefficient range calculation unit 122 is also different to the first embodiment.

Figure 16:
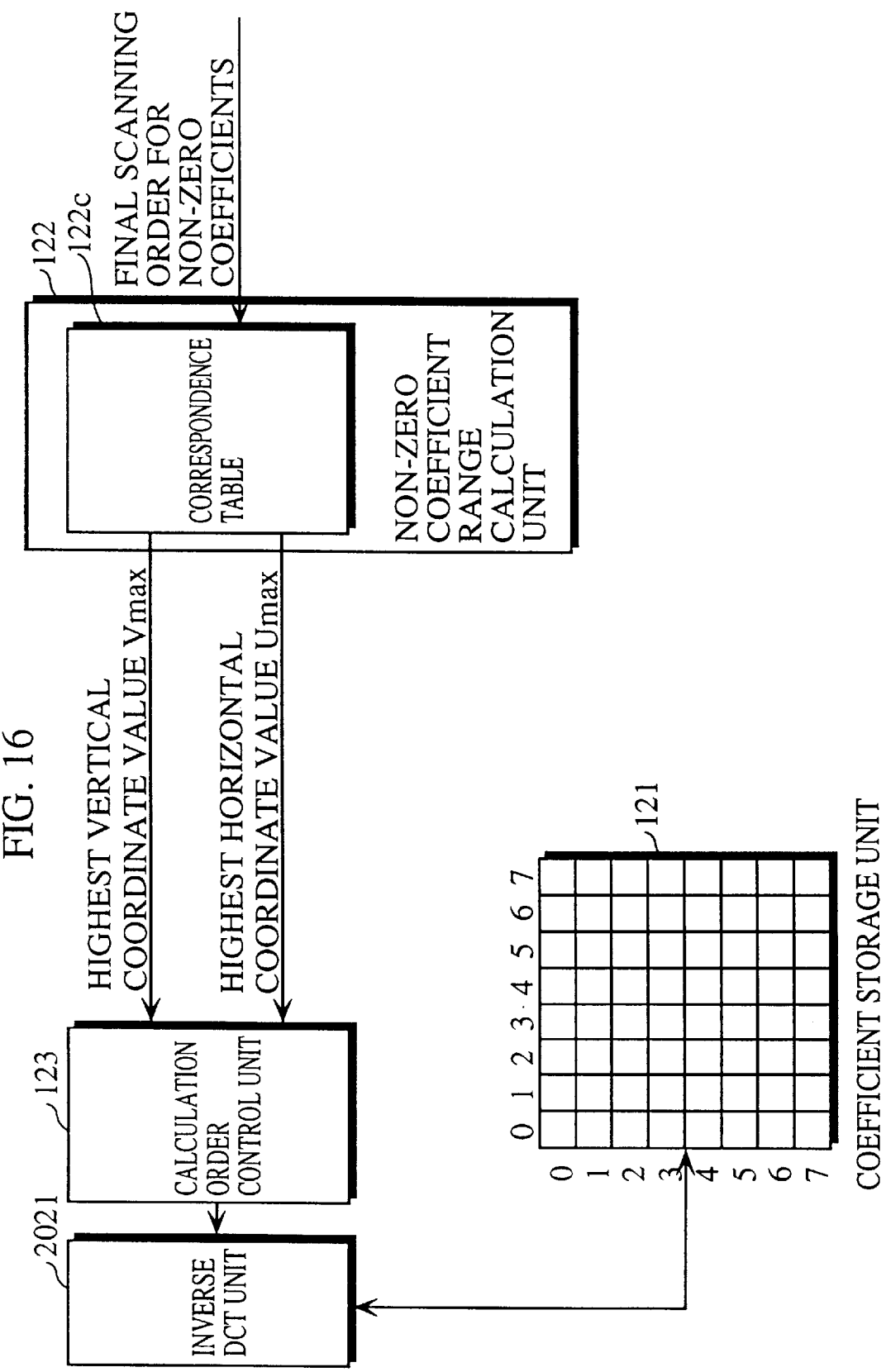
FIG. 16 shows the relationship between the detailed configuration of the non-zero coefficient range calculation unit 122 and the other construction elements.

The following explanation will focus an these differences with the first embodiment. Here, the detailed configuration of the non-zero coefficient range calculation unit 122 and its relationship with construction elements 123, 2021, and 121 are shown in FIG. 16. As shown in the figure, the non-zero coefficient range calculation unit 122 includes a correspondence table 122c so that it can specify the highest coordinate values in each axis of the region containing the non-zero coefficients by referring to the correspondence table based on the final scanning order number, out of the scanning order numbers received from the non-zero coefficient scanning order calculation unit 2023a.

Figure 17:
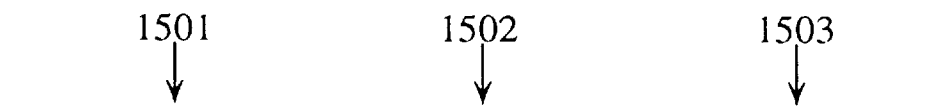
FIG. 17 shows the content of the correspondence table 122c in the same embodiment.

The content of the correspondence table is shown in FIG. 17. As shown in the figure, the correspondence table 122c stores data which has been readied beforehand. Column 1501 stores all of the scanning order numbers which compose one block, while columns 1502 and 1503 store highest values umax, vmax in each axis out of the coordinate values (u,v), when it is supposed that all of the DCT coefficients S'(u,v) up to each of the final scanning order numbers are non-zero.

Figure 18:
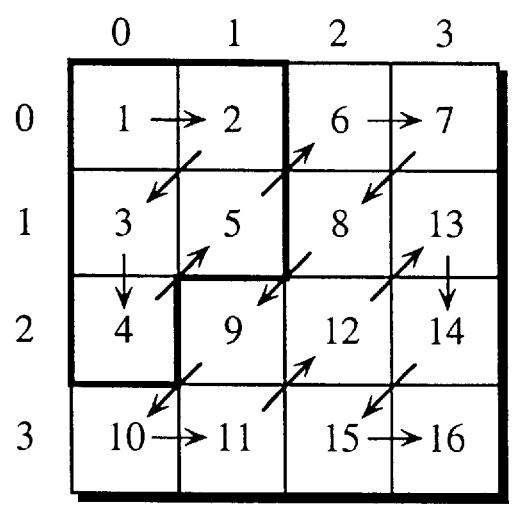
FIG. 18 is a figure for explaining the relationship between the highest values umax, vmax and the scanning order in the correspondence table 122c of the same apparatus.

FIG. 18 shows the relationship between the scanning order numbers 1501 in the correspondence table 122c and umax 1502 and vmax 1503.

As one example, when the final scanning order number obtained from the non-zero coefficient scanning order calculation unit 2023a is "5", as shown in FIG. 17, umax=1 and vmax=2. As can be seen from FIG. 18, when all of the five DCT coefficients S'(u,v) from scanning order number 1 to scanning order number 5 are non-zero, the highest values umax, vmax for the u coordinates and v coordinates of these DCT coefficients S'(u,v) are 1 and 2, respectively.

In this way, since the data to be decompressed by the present embodiment has been compressed by a zigzag scanning operation from the top-left of a block to the bottom-left, it is possible to prepare a fixed correspondence table 122c.

Operation

The following is an explanation of the present embodiment constructed as described above.

In the same way as in the first embodiment, the non-zero coefficient scanning order calculation unit 2023a informs the non-zero coefficient range calculation unit 122 of grouped information which is composed of all of the non-zero coefficients which compose one block and the scanning order numbers.

On sequentially receiving the scanning order numbers from the non-zero coefficient scanning order calculation unit 2023a, the non-zero coefficient range calculation unit 122 stores only the latest scanning order number and judges whether it is the final non-zero coefficient in a block. This judgement as to whether it is the final non-zero coefficient in the block is made by detecting the "END" data which is positioned at the end of the block.

As a result, having obtained the final scanning order number, the non-zero coefficient range calculation unit 122 refers to the correspondence table 122c, reads the highest values umax, vmax which are stored in the same row as the zigzag scanning order number which corresponds to that non-zero coefficient, and informs the calculation order control unit 123 of these highest values umax, vmax. This in to say, the non-zero coefficient range calculation unit 122 specifies the coordinate range which includes the non-zero coefficients just by looking up one number in the correspondence table 122c.

On being informed of the highest values umax, vmax, the calculation order control unit 123 uses these values to control the inverse DCT unit 2021, by doing so having the inverse DCT unit 2021 perform inverse DCT in accordance with Equations 7 and 8 (where umin=0 and vmin=0).

Figure 19B:
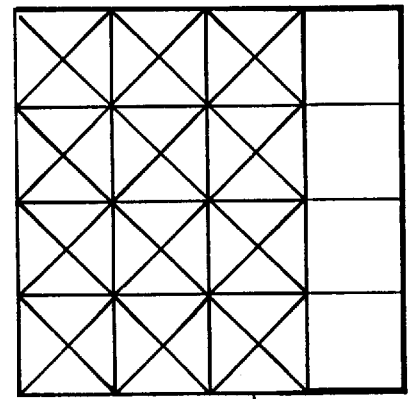
FIG. 19 is a figure showing the specific operation of the non-zero coefficient range calculation unit 122 in the present apparatus.
Figure 19A:
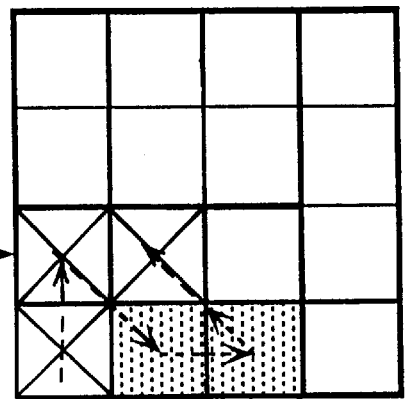
Figure 21B:
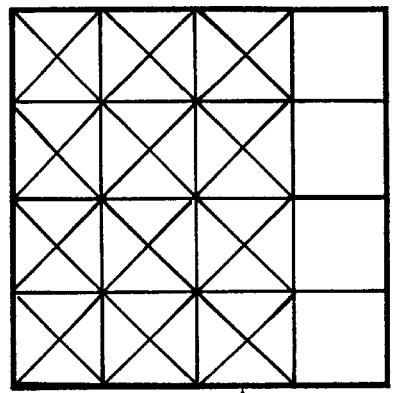
FIGS. 21(a) and 21(b) are figures showing the specific operation of the non-zero coefficient range calculation unit 122 using the correspondence table shown in FIG. 20.
Figure 21A:
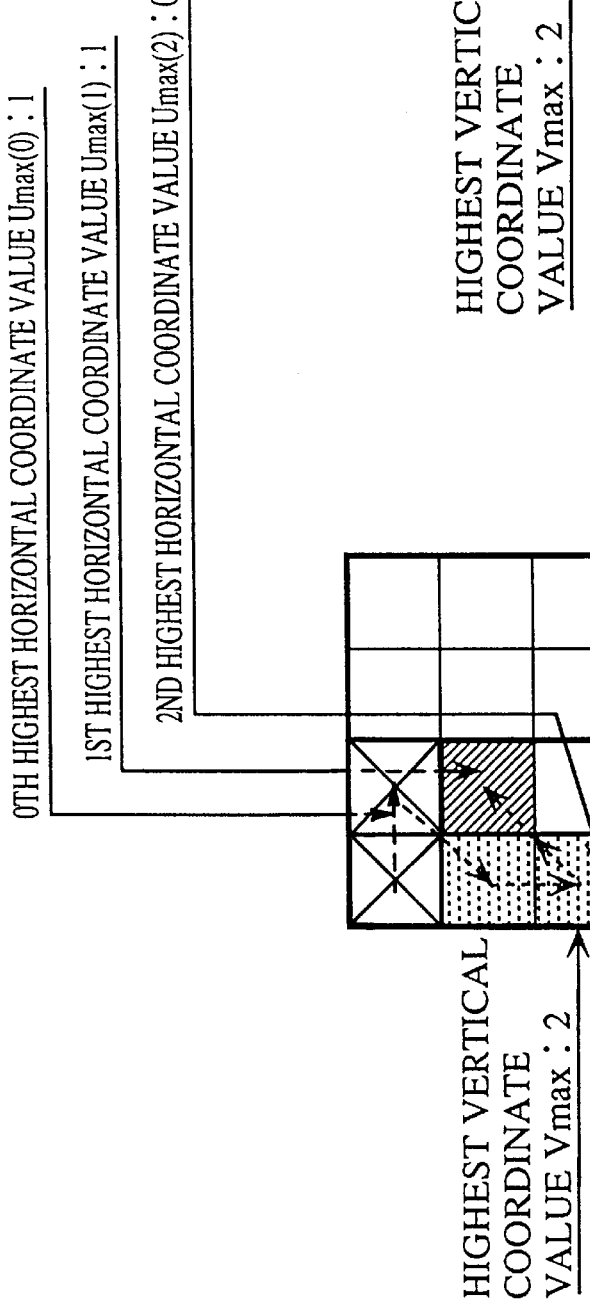

FIGS. 19(a) and 19(b) show specific repetitions of the sum of products calculations by the present embodiment, and correspond to FIGS. 8(a) and 8(b) in the first embodiment. FIG. 19(a) shows the values of the DCT coefficients S'(u,v) stored in the coefficient storage unit 121 when the final scanning number obtained from the non-zero coefficient scanning order calculation unit 2023a is "5", with the x-marked part of FIG. 19(a) showing non-zero coefficients and the gray part of FIG. 19(a) showing zero coefficients.

For the stated case, the non-zero coefficient range calculation unit 122 obtains the information umax=1, vmax=2 by looking up the correspondence table 122c and informs the calculation order control unit 123 of this information, so that the inverse DCT unit 2021 first performs a one-dimensional inverse DCT in the horizontal (u) axis for the six DCT coefficients S'(0,0), S'(1,0), S'(0,1), S'(1,1), S'(0,2), S'(1,2), before performing a one-dimensional inverse DCT in the vertical (v) axis for the twelve intermediate values r(x,v) shown by the x-marked part in FIG. 19(b).

In this way, the present embodiment does not need to compare coordinates in detail and can instead specify the coordinate range of the non-zero coefficients for which an inverse DCT is to be performed by merely referring once to the correspondence table 122c which is prepared beforehand. Like the first embodiment, the present embodiment can omit sum of products calculations for zeros, which is to say unnecessary calculations where the result is obviously zero, which are performed by conventional apparatuses, although, unlike the first embodiment, comparisons are no longer necessary.

It should be noted here that while the present embodiment uses the correspondence table 122c which, as shown in FIG. 17, only stores the two highest values umax and vmax, an alternative correspondence table, such as that shown in FIG. 20(a) or that shown in FIG. 20(b), may be used.

The correspondence table shown in FIG. 20(a) is a more detailed version of the correspondence table 122c shown in FIG. 17, with a highest value umax (v) being stored for every coordinate value v (where $0 \leq v \leq$ vmax) instead of the single highest value umax used in FIG. 17.

As one example, when the zigzag scanning order number "5" is received from the non-zero coefficient scanning order calculation unit 2023a, the non-zero coefficient range calculation unit 122 obtains the values umax(0)=1, umax(1)=1, umax(2)=0, umax(3)==1, vmax=2 from the correspondence table and sends these values to the calculation order control unit 123. As a result, the inverse DCT unit 2021 performs a one-dimensional inverse DCT is the horizontal (u) axis for only the five DCT coefficients S'(0,0), S'(1,0), S'(0,1), S'(1,1), S'(0,2).

In more detail, when calculating intermediate values G(x,0) when v=0, calculation of sum of products is only performed for S'(0,0) and S'(1,0), when calculating intermediate values G(x,1) when v=1, calculation of sum of products is only performed for S'(0,1) and S'(1,1), and when calculating intermediate values G(x,2) when v=2, calculation of sum of products is only performed for S'(0,2). It should be noted here that the number of repetitions of sum of products when performing the one-dimensional inverse DCT in the vertical (v) axis which follows the first inverse DCT will be the same as when the correspondence table in FIG. 17 is used.

In this way, while sum of products calculations were performed for six DCT coefficients when the correspondence table of FIG. 17 was used, by using the correspondence table of FIG. 20(a) instead, sum of products calculations only need to be performed for five DCT coefficients. Here, it should be clear that the technical concept behind using the correspondence table in FIG. 20(a) instead of the correspondence table in FIG. 17 is the same as the replacement of the comparator 122a in the first embodiment with the comparator 122b in the second embodiment.

On the other hand, the correspondence table of FIG. 20(b) is a reduced version of the correspondence table of FIG. 20(a), with pluralities of zigzag scanning order numbers being grouped together in the correspondence table of FIG. 20(b).

This uses the principle that zigzag scanning order numbers correspond to the ascending order of spatial frequencies of images, so that, in general, the higher the frequency, the smaller the component which includes that frequency.

By using the correspondence table of FIG. 20(b), a correspondence table which is smaller than that in FIG. 20(a) can be used, and the probability that sum of products calculations for zeros are avoided is increased.

While the present invention has been described using the above four embodiments, it should be obvious that it is not limited to such. While the processing is described for two-dimensional image data P(x,y), it should not be limited to two dimensions, As one example, if the third embodiment uses three-dimensional image data P(x,y,z), the subtraction unit 123a will calculate differences in three axes, the sorting unit 123b will sort these three axes into order and the calculation order control unit 123 will perform control so that three one-dimensional inverse DCTs are executed in an appropriate order.

The present apparatus was also described as dealing with image data which has been compressed according to a linear transform called DCT, although for the present invention such linear transformation is not limited to DCT, so that others, such as a Karhunen-Loeve (K-L) transform, may be used. Also, DCT and K-L transform are merely examples of orthogonal transforms, with the present invention not being limited to orthogonal transforms. Since the present invention can achieve high-speed decompression by omitting sum of products calculations for zeros, it can decompress image data which has been compressed using any linear transform where inverse transform is performed by sum of products calculations.

During manufacture of the present apparatus, any of the single construction elements may be divided into a plurality of elements, or alternatively construction elements may be grouped together into a single component.

The present invention may also be used to decode the first image or scene, called an I picture, in MPEG compressed moving picture data. When decoding P pictures or B pictures which reflect a time difference and movement compensation, many of the high-frequency components of coefficients which have undergone a two-dimensional discrete cosine transform will be zero, so that the decoding of both time differences and movement compensation can also be handled by the present invention.

Although the present invention has been fully described by way of examples with reference to the accompanying drawings, it in to be noted that various changes and modifications will be apparent to those skilled in the art. Therefore, unless such changes and modifications depart from the scope of the present invention, they should be construed as being included therein.

What is claimed is:

1. An apparatus for decompressing image data, wherein said compressed image data has been compressed by performing an n-dimensional transform (n being an integer) for groups of original image data which include every pixel in an n-dimensional coordinate space, sorting each resulting coefficient in the n-dimensional coordinate space into a sequence according to a predetermined order, and forming sets of grouped data which are each made of a non-zero coefficient and an order number showing a position of the non-zero coefficient in the sequence, said apparatus comprising:

storage means (a) which includes an area for storing every coefficient in the n-dimensional coordinate space;

initializing means (b) for having the storage means (a) store a value zero for every coefficient;

coordinate value calculating means (c) for calculating, on receiving a set of said grouped data, coordinate values in the n-dimensional coordinate space for the non-zero coefficient included the set of said grouped data, based on the order number included in the set of grouped data;

writing means (d) for writing a non-zero coefficient into a storage location in said storage means (a) which corresponds to the coordinate values calculated by the coordinate value calculating means (c);

non-zero coefficient region specifying means (e) for specifying a region in the storage means (a) which stores non-zero coefficients; and inverse transform means (f) for restoring data to data which corresponds to original image data by performing an n-dimensional inverse transform for only coefficients in the region specified by the non-zero coefficient region specifying means (e), wherein the n-dimensional inverse transform is a sum of products calculation using the coefficients, wherein the n-dimensional inverse transform can be divided into n separate one-dimensional inverse transforms, wherein the non-zero coefficient region specifying means (e) specifies a coordinate range which shows where the non-zero coefficients are located, in each out of m axes which compose the n-dimensional coordinate space, where m is an integer between one and n, and wherein the inverse transform means(f) includes:
a first inverse transform unit (f1) which performs a one-dimensional inverse transform, for each of the m axes using only the coefficients which belong to the coordinate range specified by the non-zero coefficient region specifying means(e); and
a second inverse transform unit (f2) for performing a one-dimensional inverse transform using all of the coefficients in the coordinate range for each of the (n–m) remaining axes:
wherein the non-zero coefficient region specifying means (e) specifies, in each of the m axes, a highest value out of the coordinates of all of the non-zero coefficients calculated by the coordinate value calculating means (c), and sets the highest value as one edge of the coordinate range.

2. The image data decompression apparatus of claim 1, wherein the non-zero coefficient region specifying means(e) specifies, in each of the m axes, a lowest value and a highest value out of the coordinates of all of the non-zero coefficients calculated by the coordinate value calculating means (c), and sets a range from the lowest value to the highest value as said coordinate range.

3. The image data decompression apparatus of claim 2, wherein m is equal to n.

4. The image data decompression apparatus of claim 3, wherein said transform is an orthogonal transform, and said inverse transform is an inverse orthogonal transform.

5. The image data decompression apparatus of claim 4, wherein said transform is a discrete cosine transform (hereinafter, "DCT"), and said inverse transform is an inverse discrete cosine transform (hereinafter, "inverse DCT").

6. An apparatus for decompressing image data, wherein said compressed image data has been compressed by performing an n-dimensional transform (n being an integer) for groups of original image data which include every pixel in an n-dimensional coordinate space, sorting each resulting coefficient in the n-dimensional coordinate space into a sequence according to a predetermined order, and forming sets of grouped data which are each made of a non-zero coefficient and an order number showing a position of the non-zero coefficient in the sequence, said apparatus comprising:
storage means (a) which includes an area for storing every coefficient in the n-dimensional coordinate space;
initializing means (b) for having the storage means (a) store a value zero for every coefficient;
coordinate value calculating means (c) for calculating, on receiving a set of said grouped data, coordinate values in the n-dimensional coordinate space for the non-zero coefficient included the set of said grouped data, based on the order number included in the set of grouped data;
writing means (d) for writing a non-zero coefficient into a storage location in said storage means (a) which corresponds to the coordinate values calculated by the coordinate value calculating means (c);
non-zero coefficient region specifying means (e) for specifying a region in the storage means (a) which stores non-zero coefficients; and
inverse transform means (f) for restoring data to data which corresponds to original image data by performing an n-dimensional inverse transform for only coefficients in the region specified by the non-zero coefficient region specifying means (e),
wherein the n-dimensional inverse transform is a sum of products calculation using the coefficients,
wherein the n-dimensional inverse transform can be divided into n separate one-dimensional inverse transforms,
wherein the non-zero coefficient region specifying means (e) specifies a coordinate range which shows where the non-zero coefficients are located, in each out of m axes which compose the n-dimensional coordinate space, where m is an integer between one and n,
and wherein the inverse transform means(f) includes:
a first inverse transform unit (f1) which performs a one-dimensional inverse transform, for each of the m axes using only the coefficients which belong to the coordinate range specified by the non-zero coefficient region specifying means(e); and
a second inverse transform unit (f2) for performing a one-dimensional inverse transform using all of the coefficients in the coordinate range for each of the (n–m) remaining axes,
wherein m is at least two,
wherein the inverse transform means (f) further includes a sorting unit (f9) for arranging the m coordinate axes into order by sorting lengths of the coordinate ranges specified by the non-zero coefficient region specifying means (e) into descending order,
wherein the first inverse transform unit (f1) performs one-dimensional inverse transform in the m axes in the order into which the axes have been arranged by the sorting unit (f9) after the second inverse transform unit (f2) has completed a one-dimensional inverse transform, and
wherein the non-zero coefficient region specifying means (e) specifies, in each of the m axes, a highest value out of the coordinates of all of the non-zero coefficients calculated by the coordinate value calculating means (c), and sets the highest value as one edge of said coordinate range.

7. The image data decompression apparatus of claim 6, wherein the non-zero coefficient region specifying means(e) specifies, in each of the m axes, a lowest value and a highest value out of the coordinates of all of the non-zero coefficients calculated by the coordinate value calculating means (c), and sets a range from the lowest value to the highest value as said coordinate range.

8. The image data decompression apparatus of claim 7, wherein m is equal to n.

9. The image data decompression apparatus of claim 8, wherein said transform is an orthogonal transform, and said inverse transform is an inverse orthogonal transform.

10. The image data decompression apparatus of claim 9, wherein said transform is a discrete cosine transform (hereinafter, "DCT"), and said inverse transform is an inverse discrete cosine transform (hereinafter, "inverse DCT").

11. An apparatus for decompressing image data, wherein said compressed image data has been compressed by performing an n-dimensional transform (n being an integer) for groups of original image data which include every pixel in an n-dimensional coordinate space, sorting each resulting coefficient in the n-dimensional coordinate space into a sequence according to a predetermined order, and forming sets of grouped data which are each made of a non-zero coefficient and an order number showing a position of the non-zero coefficient in the sequence, said apparatus comprising:

storage means (a) which includes an area for storing every coefficient in the n-dimensional coordinate space;

initializing means (b) for having the storage means (a) store a value zero for every coefficient;

coordinate value calculating means (c) for calculating, on receiving a set of said grouped data, coordinate values in the n-dimensional coordinate space for the non-zero coefficient included the set of said grouped data, based on the order number included in the set of grouped data;

writing means (d) for writing a non-zero coefficient into a storage location in said storage means (a) which corresponds to the coordinate values calculated by the coordinate value calculating means (c);

non-zero coefficient region specifying means (e) for specifying a region in the storage means (a) which stores non-zero coefficients; and inverse transform means (f) for restoring data to data which corresponds to original image data by performing an n-dimensional inverse transform for only coefficients in the region specified by the non-zero coefficient region specifying means (e), wherein the n-dimensional inverse transform is a sum of products calculation using the coefficients, wherein the n-dimensional inverse transform can be divided into n separate one-dimensional inverse transforms, wherein the non-zero coefficient region specifying means (e) specifies a coordinate range which shows where the non-zero coefficients are located, in each out of m axes which compose the n-dimensional coordinate space, where m is an integer between one and n, and wherein the inverse transform means(f) includes:

a first inverse transform unit (f1) which performs a one-dimensional inverse transform, for each of the m axes, using only the coefficients which belong to the coordinate range specified by the non-zero coefficient region specifying means(e); and a second inverse transform unit (f2) for performing a one-dimensional inverse transform using all of the coefficients in the coordinate range for each of the (n–m) remaining axes;

wherein the non-zero coefficient region specifying means (e) includes:

a first correspondence storage unit (e1) for storing order numbers and, corresponding to each order number, a highest value in each coordinate axis out of non-zero coefficients when it is presumed that every coefficient having an order number equal to or below a present order number is a non-zero coefficient;

a final non-zero coefficient detection unit (e2) for detecting that a final non-zero coefficient has been provided out of non-zero coefficients which are necessary to restore all data to data which corresponds to the original image data; and a first highest value specifying unit (e3) for specifying, based on correspondence information stored by the first correspondence storage unit (e1), a highest coordinate value in each axis corresponding to an order number of a non-zero coefficient detected by the final non-zero coefficient detection unit (e2), and setting the highest coordinate value as one edge of the coordinate range.

12. The image data decompression apparatus of claim 11, wherein said transform is an orthogonal transform, and said inverse transform is an inverse orthogonal transform.

13. The image data decompression apparatus of claim 12, wherein said transform is a discrete cosine transform (hereinafter, "DCT"), and said inverse transform is an inverse discrete cosine transform (hereinafter, "inverse DCT").

14. An apparatus for decompressing image data, wherein said compressed image data has been compressed by performing an n-dimensional transform (n being an integer) for groups of original image data which include every pixel in an n-dimensional coordinate space, sorting each resulting coefficient in the n-dimensional coordinate space into a sequence according to a predetermined order, and forming sets of grouped data which are each made of a non-zero coefficient and an order number showing a position of the non-zero coefficient in the sequence, said apparatus comprising:

storage means (a) which includes an area for storing every coefficient in the n-dimensional coordinate space;

initializing means (b) for having the storage means (a) store a value zero for every coefficient;

coordinate value calculating means (c) for calculating, on receiving a set of said grouped data, coordinate values in the n-dimensional coordinate space for the non-zero coefficient included the set of said grouped data, based on the order number included in the set of grouped data;

writing means (d) for writing a non-zero coefficient into a storage location in said storage means (a) which corresponds to the coordinate values calculated by the coordinate value calculating means (c);

non-zero coefficient region specifying means (e) for specifying a region in the storage means (a) which stores non-zero coefficients; and inverse transform means (f) for restoring data to data which corresponds to original image data by performing an n-dimensional inverse transform for only coefficients in the region specified by the non-zero coefficient region specifying means (e), wherein the n-dimensional inverse transform is a sum of products calculation using the coefficients, wherein the n-dimensional inverse transform can be divided into n separate one-dimensional inverse transforms, wherein the non-zero coefficient region specifying means (e) includes a first specifying unit (e4) for specifying a coordinate range in which the non-zero coefficients are located for one out of the n coordinate axes which compose the n-dimensional coordinate space, for each combination of coordinates in remaining (n–1) coordinate axes, and wherein the inverse transform means (f) includes:

a third inverse transform unit (f3) for performing a one-dimensional inverse transform using only coefficients which belong to the coordinate range specified by the first specifying unit (e4) in said one of the n coordinate axes; and a fourth inverse transform unit (f4) for performing a one-dimensional inverse transform in each of the remaining (n−1) coordinate axes.

15. The image data decompression apparatus of claim 14, wherein the non-zero coefficient region specifying means (s) includes a second specifying unit (e5) for specifying a coordinate range in which the non-zero coordinates are located, for k (k being an integer between 1 and (n−1)) out of the (n−1) remaining coordinate axes, wherein the fourth inverse transform unit includes a fifth inverse transform unit for performing a one-dimensional inverse transform using only the coefficients belonging to the coordinate range specified by the second specifying unit (e5) and a sixth inverse transform unit for performing a one-dimensional inverse transform for all of the coefficients in a coordinate ranges of each of the remaining (n−1-k) axes.

16. The image data decompression apparatus of claim 15, wherein the first specifying unit (e4) specifies, in one coordinate axis, a highest value out of the coordinates of all of the non-zero coefficients calculated by the coordinate value calculating means(c), for each combination of coordinate values in remaining (n−1) coordinate axes, and sets the highest value as one edge of said coordinate range, and wherein the second specifying unit (e5) specifies, in each of the k coordinate axes, a highest value out of the coordinates of all of the non-zero coefficients calculated by the coordinate value calculating means(c), and sets the highest value at one edge of said coordinate range.

17. The image data decompression apparatus of claim 16, wherein the first specifying unit (e4) specifies, in one coordinate axis, a lowest value and a highest value out of the coordinates of all of the non-zero coefficients calculated by the coordinate value calculating means(c), for each combination of coordinates in remaining (n−1) coordinate axes, and sets a range from the lowest value to the highest value as said coordinate range, and wherein the second specifying unit (e5) specifies, in each of the k coordinate axes, a lowest value and a highest value out of the coordinates of all of the non-zero coefficients calculated by the coordinate value calculating means(c), and sets a range from the lowest value to the highest value as said coordinate range.

18. The image data decompression apparatus of claim 17, wherein k is equal to (n−1).

19. The image data decompression apparatus of claim 18, wherein said transform is an orthogonal transform, and said inverse transform is an inverse orthogonal transform.

20. The image data decompression apparatus of claim 19, wherein said transform is a discrete cosine transform (hereinafter, "DCT"), and said inverse transform is an inverse discrete cosine transform (hereinafter, "inverse DCT").

21. An apparatus for decompressing image data, wherein said compressed image data has been compressed by performing an n-dimensional transform (n being an integer) for groups of original image data which include every pixel in an n-dimensional coordinate space, sorting each resulting coefficient in the n-dimensional coordinate space into a sequence according to a predetermined order, and forming sets of grouped data which are each made of a non-zero coefficient and an order number showing a position of the non-zero coefficient in the sequence, said apparatus comprising:

storage means (a) which includes an area for storing every coefficient in the n-dimensional coordinate space;

initializing means (b) for having the storage means (a) store a value zero for every coefficient;

coordinate value calculating means (c) for calculating, on receiving a set of said grouped data, coordinate values in the n-dimensional coordinate space for the non-zero coefficient included the set of said grouped data, based on the order number included in the set of grouped data;

writing means (d) for writing a non-zero coefficient into a storage location in said storage means (a) which corresponds to the coordinate values calculated by the coordinate value calculating means (c);

non-zero coefficient region specifying means (e) for specifying a region in the storage means (a) which stores non-zero coefficients; and inverse transform means (f) for restoring data to data which corresponds to original image data by performing an n-dimensional inverse transform for only coefficients in the region specified by the non-zero coefficient region specifying means (e), wherein the n-dimensional inverse transform is a sum of products calculation using the coefficients, wherein the n-dimensional inverse transform can be divided into n separate one-dimensional inverse transforms, wherein the non-zero coefficient region specifying means (e) includes:

a second correspondence storage unit (e6) for storing order numbers (i) and, corresponding to each order number, for a supposition that "all coefficients up to and including a present order number are non-zero coefficients", a highest value (ii) in a coordinate axis, selected out of the coordinate axes which compose the n-dimensional coordinate space, for each combination of the non-zero coefficients, wherein each combination of non-zero coefficients is formed by grouping together non-zero coordinates when a combination of coordinate values in all but the selected coordinate axis (n−1 coordinate axes) is equal, and a highest value (iii) in each of the remaining (n−1) coordinate axes for all of non-zero coefficients under said supposition;

a final non-zero coefficient detection unit (e2) for detecting that a final non-zero coefficient has been provided out of non-zero coefficients which are necessary to restore all data to data which corresponds to the original image data; and a second highest value specifying unit (e7) for specifying, based on correspondence information stored by the second correspondence storage unit (e6), a highest coordinate value for each axis and each combination corresponding to an order number of a non-zero coefficient detected by the final non-zero coefficient detection unit (e2), and setting the highest coordinate value as one edge of said coordinate range, and wherein the inverse transform means (f) includes:

a seventh inverse transform unit (f7) for performing a one-dimensional inverse transform only using coefficients located in said coefficient range specified by the second highest value specifying unit (e7) in said selected coordinate axis; and an eighth transform unit (f8) for performing a one-dimensional inverse transform in each of the remaining (n−1) coordinate axes, using only coefficients located in the coordinate range specified by the second highest value specifying unit (e7).

22. The image data decompression apparatus of claim 21, wherein said transform is an orthogonal transform, and said inverse transform is an inverse orthogonal transform.

23. The image data decompression apparatus of claim 22, wherein said transform is a discrete cosine transform (hereinafter, "DCT"), and said inverse transform is an inverse discrete cosine transform (hereinafter, "inverse DCT").

* * * * *